(12) United States Patent
Liu et al.

(10) Patent No.: US 12,192,921 B2
(45) Date of Patent: Jan. 7, 2025

(54) SYNCHRONIZATION SIGNAL TRANSMISSION METHOD AND TERMINAL

(71) Applicant: VIVO MOBILE COMMUNICATION CO., LTD., Guangdong (CN)

(72) Inventors: Siqi Liu, Chang'an Dongguan (CN); Zichao Ji, Chang'an Dongguan (CN); Kai Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 729 days.

(21) Appl. No.: 17/160,248

(22) Filed: Jan. 27, 2021

(65) Prior Publication Data

US 2021/0153146 A1    May 20, 2021

Related U.S. Application Data

(63) Continuation of application No. PCT/CN2019/096338, filed on Jul. 17, 2019.

(30) Foreign Application Priority Data

Jul. 27, 2018 (CN) .......................... 201810856303.1

(51) Int. Cl.
*H04W 56/00* (2009.01)
*H04L 5/00* (2006.01)

(52) U.S. Cl.
CPC ......... *H04W 56/001* (2013.01); *H04L 5/0053* (2013.01); *H04L 5/0094* (2013.01)

(58) Field of Classification Search
None
See application file for complete search history.

(56) References Cited

U.S. PATENT DOCUMENTS

| | | | |
|---|---|---|---|
| 2016/0174174 A1 | 6/2016 | Chae et al. |
| 2017/0013577 A1 | 1/2017 | Berggren |
| 2017/0055234 A1 | 2/2017 | Seo et al. |
| 2017/0245229 A1 | 8/2017 | Seo et al. |

(Continued)

FOREIGN PATENT DOCUMENTS

| | | | |
|---|---|---|---|
| CN | 106797265 A | 5/2017 |
| CN | 107113552 A | 8/2017 |

(Continued)

OTHER PUBLICATIONS

EP Search Report in Application No. 19840206.7 dated Aug. 25, 2021.

(Continued)

*Primary Examiner* — Kouroush Mohebbi
(74) *Attorney, Agent, or Firm* — BROOKS KUSHMAN P.C.

(57) ABSTRACT

A synchronization signal transmission method and a terminal are provided. The synchronization signal transmission method, applied to a terminal, includes: transmitting or receiving a sidelink synchronization signal block, where the sidelink synchronization signal block includes: a primary sidelink synchronization signal PSSS and a secondary sidelink synchronization signal SSSS, the PSSS and the SSSS being distributed in orthogonal frequency division multiplexing OFDM symbols occupied by the sidelink synchronization signal block.

16 Claims, 5 Drawing Sheets

(56) References Cited

U.S. PATENT DOCUMENTS

| | | |
|---|---|---|
| 2017/0272299 A1 | 9/2017 | Chae et al. |
| 2018/0019904 A1 | 1/2018 | Lee et al. |
| 2018/0054788 A1 | 2/2018 | Kwon et al. |
| 2018/0092002 A1 | 3/2018 | Manolakos et al. |
| 2018/0098299 A1 | 4/2018 | Chae |
| 2018/0270776 A1 | 9/2018 | Yasukawa et al. |
| 2018/0302202 A1* | 10/2018 | Kim ............. H04L 5/0048 |
| 2018/0352525 A1 | 12/2018 | Li et al. |
| 2020/0015214 A1* | 1/2020 | Si ............. H04W 76/14 |

FOREIGN PATENT DOCUMENTS

| | | | | |
|---|---|---|---|---|
| CN | 107734557 A | 2/2018 | | |
| CN | 108141340 A | 6/2018 | | |
| EP | 3 099 123 A1 | 11/2016 | | |
| EP | 3142273 A1 * | 3/2017 | ............. | H04J 11/00 |
| EP | 3 190 732 A1 | 7/2017 | | |
| KR | 20160060695 A | 5/2016 | | |
| KR | 20170003547 A | 1/2017 | | |
| KR | 20180020863 A | 2/2018 | | |
| WO | 2017057321 A1 | 4/2017 | | |
| WO | 2017057987 A1 | 4/2017 | | |
| WO | 2017124338 A1 | 7/2017 | | |

OTHER PUBLICATIONS

"Synchronization enhancement for V2V" 3GPP TSG-RAN WG1 Meeting #82bis, R1-1552324, ZTE, Oct. 5, 2019.
Written Opinion and International Search Report in Application No. PCT/CN2019/096338 dated Feb. 11, 2021.
IN Office Action in Application No. 202127008356 dated Jan. 20, 2022.
JP Office Action in Application No. 2021-527268 dated Mar. 7, 2022.
EP Office Action dated Mar. 31, 2023 as received in Application No. 19840206.7.
First Office Action for Korean Application No. 10-2021-7005204, dated Feb. 27, 2024, 4 Pages.

* cited by examiner

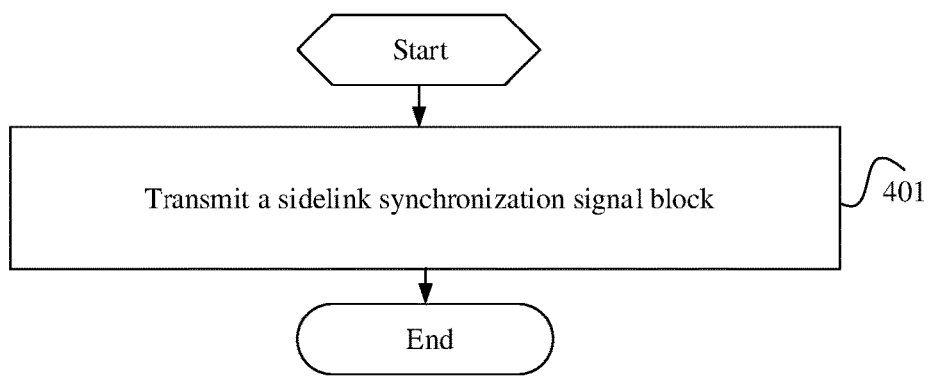

| 0 | 1 | 2 | 3 | 4 | 5 | 6 | 7 | 8 | 9 | 10 | 11 | 12 | 13 |
|---|---|---|---|---|---|---|---|---|---|----|----|----|----|
|   | PSSS |   |   | SSSS |   | GP |   | PSSS |   |    | SSSS |   | GP |

SL-SSB1        SL-SSB2

FIG. 6

| 0 | 1 | 2 | 3 | 4 | 5 | 6 | 7 | 8 | 9 | 10 | 11 | 12 | 13 |
|---|---|---|---|---|---|---|---|---|---|----|----|----|----|
|   | PSSS |   |   |   | SSSS | GP |   | PSSS |   |    |    | SSSS | GP |

SL-SSB1        SL-SSB2

FIG. 7

| 0 | 1 | 2 | 3 | 4 | 5 | 6 | 7 | 8 | 9 | 10 | 11 | 12 | 13 |
|---|---|---|---|---|---|---|---|---|---|----|----|----|----|
|   |   | PSSS |   |   | SSSS | GP |   |   | PSSS |    |    | SSSS | GP |

SL-SSB1        SL-SSB2

FIG. 8

| 0 | 1 | 2 | 3 | 4 | 5 | 6 | 7 | 8 | 9 | 10 | 11 | 12 | 13 |
|---|---|---|---|---|---|---|---|---|---|----|----|----|----|
|   |   |   | PSSS |   | SSSS | GP |   |   |   | PSSS |    | SSSS | GP |

SL-SSB1        SL-SSB2

FIG. 9

| 0 | 1 | 2 | 3 | 4 | 5 | 6 | 7 | 8 | 9 | 10 | 11 | 12 | 13 |
|---|---|---|---|---|---|---|---|---|---|----|----|----|----|
|   |   | PSSS | PSSS |   |   |   |   |   |   | SSSS | SSSS | GP | GP |

FIG. 14

| 0 | 1 | 2 | 3 | 4 | 5 | 6 | 7 | 8 | 9 | 10 | 11 | 12 | 13 |
|---|---|---|---|---|---|---|---|---|---|----|----|----|----|
|   | PSSS | PSSS |   |   |   |   |   |   |   |   | SSSS | SSSS | GP |

FIG. 15

| 0 | 1 | 2 | 3 | 4 | 5 | 6 | 7 | 8 | 9 | 10 | 11 | 12 | 13 |
|---|---|---|---|---|---|---|---|---|---|----|----|----|----|
|   |   |   |   | PSSS |   | PSSS |   |   | SSSS |   | SSSS | GP | GP |

FIG. 16

| 0 | 1 | 2 | 3 | 4 | 5 | 6 | 7 | 8 | 9 | 10 | 11 | 12 | 13 |
|---|---|---|---|---|---|---|---|---|---|----|----|----|----|
|   |   | PSSS |   |   | PSSS |   |   | SSSS |   |   | SSSS | GP | GP |

FIG. 17

SYNCHRONIZATION SIGNAL TRANSMISSION METHOD AND TERMINAL

CROSS-REFERENCE TO RELATED APPLICATIONS

This application is continuation application of PCT International Application No. PCT/CN2019/096338 filed on Jul. 17, 2019, which claims priority to Chinese Patent Application No. 201810856303.1, filed in China on July 27, the disclosures of which are incorporated in their entireties by reference herein.

TECHNICAL FIELD

This disclosure relates to the field of communications technologies, and in particular, to a synchronization signal transmission method and a terminal.

BACKGROUND

In the design of a new radio (New Radio, NR) system, an NR base station needs to send a synchronization signal block (Synchronization Signal Block, SSB, also known as SS/PBCH Block, that is. synchronization signal/physical broadcast signal block) for a terminal to perform synchronization, system information acquisition, measurement, assessment, and the like. One SSB consists of two components: a new radio synchronization signal (NR-SS) and a new radio physical broadcast channel (NR-PBCH), where the NR-SS is divided into two parts: a new radio primary synchronization signal (NR-PSS) and a new radio secondary synchronization signal (NR-SSS). One SSB includes total 4 symbols, and a time domain composition sequence of these symbols within one SSB is PSS-PBCH-SSS-PBCH.

Synchronization sequences are also included in sidelink (Sidelink), known as a primary sidelink synchronization signal (PSSS) and a secondary sidelink synchronization signal (SSSS) respectively. A PSSS sequence in a long term evolution (Long Term Evolution, LTE) sidelink is a ZC sequence that uses a logical root different from that in an LTE primary synchronization signal (PSS). Therefore, the PSSS sequence and the LTE PSS sequence are essentially different sequences. An SSSS reuses a sequence design of a secondary synchronization signal (SSS). When corresponding IDs of the PSSS and the PSS are the same, and corresponding IDs of the SSSS and the SSS are the same, an SSSS sequence is the same as an SSS sequence. A time domain structure of PSSS and SSSS in V2X is shown in FIG. 1, with a specific distribution of the physical shared broadcast channel (PSBCH), the PSSS, the demodulation reference signal (De-Modulation Reference Signal, DMRS), and the SSSS shown in the figure.

The setting solutions of sidelink synchronization signals in related technologies cannot satisfy usage requirements, failing to ensure normal sidelink synchronization signal services for users or ensure the reliability and efficiency of communication.

SUMMARY

According to a first aspect, an embodiment of this disclosure provides a synchronization signal transmission method, applied to a terminal and including:

transmitting or receiving a sidelink synchronization signal block, where the sidelink synchronization signal block includes: a primary sidelink synchronization signal PSSS and a secondary sidelink synchronization signal SSSS, the PSSS and the SSSS being distributed in orthogonal frequency division multiplexing OFDM symbols occupied by the sidelink synchronization signal block.

According to a second aspect, an embodiment of this disclosure provides a terminal, including:

a transmission module, configured to transmit or receive a sidelink synchronization signal block, where the sidelink synchronization signal block includes: a primary sidelink synchronization signal PSSS and a secondary sidelink synchronization signal SSSS, the PSSS and the SSSS being distributed in orthogonal frequency division multiplexing OFDM symbols occupied by the sidelink synchronization signal block.

According to a third aspect, an embodiment of this disclosure provides a terminal, including: a memory, a processor, and a computer program stored in the memory and capable of running on the processor, where when the computer program is executed by the processor, the steps of the foregoing synchronization signal transmission method are implemented.

According to a fourth aspect, an embodiment of this disclosure provides a computer-readable storage medium, where the computer-readable storage medium stores a computer program, and when the computer program is executed by a processor, the steps of the foregoing synchronization signal transmission method are implemented.

BRIEF DESCRIPTION OF DRAWINGS

To describe the technical solutions in the embodiments of this application or in the related art more clearly, the following briefly describes the accompanying drawings required for describing the embodiments or the related art. Apparently, the accompanying drawings in the following description show merely some embodiments described in this application, and a person of ordinary skill in the art may still derive other drawings from these accompanying drawings without creative efforts.

FIG. 1 is a schematic diagram of a time domain structure of a PSSS and an SSSS in a sidelink;

FIG. 2 is a schematic diagram of a time domain structure of an SSB when an SSB SCS is 15 kHz;

FIG. 3 is a schematic diagram of a time domain structure of an SSB when an SSB SCS is 120 kHz;

FIG. 4 is a schematic flowchart of a synchronization signal transmission method according to an embodiment of this disclosure;

FIG. 5 is a first schematic diagram showing distribution of PSSSs and SSSSs in one slot;

FIG. 6 is a second schematic diagram showing distribution of PSSSs and SSSSs in one slot;

FIG. 7 is a third schematic diagram showing distribution of PSSSs and SSSSs in one slot;

FIG. 8 is a fourth schematic diagram showing distribution of PSSSs and SSSSs in one slot;

FIG. 9 is a fifth schematic diagram showing distribution of PSSSs and SSSSs in one slot;

FIG. 14 is a tenth schematic diagram showing distribution of PSSSs and SSSSs in one slot;

FIG. 15 is an eleventh schematic diagram showing distribution of PSSSs and SSSSs in one slot;

FIG. 16 is a twelfth schematic diagram showing distribution of PSSSs and SSSSs in one slot;

FIG. 17 is a thirteenth schematic diagram showing distribution of PSSSs and SSSSs in one slot;

DESCRIPTION OF EMBODIMENTS

Figure 10:
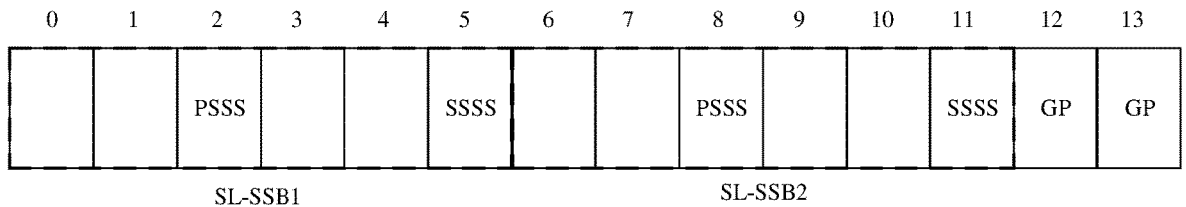
FIG. 10 is a sixth schematic diagram showing distribution of PSSSs and SSSSs in one slot.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

The terms "first", "second", and the like in this specification and claims of this application are used to distinguish between similar objects instead of describing a specific order or sequence. It should be understood that the data termed in such a manner are interchangeable in proper cases so that the embodiments of this application can be implemented in other orders than the order illustrated or described in this application. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. Moreover, the use of "and/or" in the specification and claims represents presence of at least one of the connected objects. For example, A and/or B means three cases: A alone, B alone, or A and B together.

In the embodiments of this disclosure, the terms such as "example" or "for example" are used to represent an example, an illustration, or a description. Any embodiment or design scheme described by "example" or "for example" in the embodiments of this disclosure should not be explained as being more preferred or more advantageous than other embodiments or design schemes. To be precise, the terms such as "example" or "for example" are intended to present a related concept in a specific manner.

The following describes the embodiments of this disclosure with reference to the accompanying drawings. A synchronization signal transmission method and a terminal provided in the embodiments of this disclosure may be applied to a wireless communications system. The wireless communications system may be a system employing the fifth generation (5th Generation, 5G) mobile communications technologies (hereinafter abbreviated as 5G system). A person skilled in the art may understand that the 5G NR system is only used as an example and not for limitation.

Some concepts used in the description of the embodiments of this disclosure are explained first.

A time domain structure of an SSB below is related to its subcarrier spacing (SubCarrier Spacing, SCS).

For example, when the SSB SCS is 15 kHz, the time domain structure of the SSB is shown in FIG. 2; and when the SSB SCS is 120 kHz, the time domain structure of the SSB is shown in FIG. 3.

A synchronization raster (Synchronization raster) is defined for 0-100 GHz in NR, and a synchronization raster number is a global synchronization raster number (Global SynChronization raster Number, GSCN). A base station may send an SSB on a synchronization raster, and a user may search for an SSB on the synchronization raster. Unlike in LTE, a synchronization raster is not located fixedly at the center of a carrier in which it is located. Therefore, a base station can configure carriers and send an SSB more flexibly.

Furthermore, a large bandwidth is introduced in NR, and a bandwidth may be up to 400 MHz, or even 1 GHz in a high frequency band.

An operating sidelink frequency band may overlap with an operating frequency band of NR and/or other services. If a raster of a synchronization signal in a sidelink is too close to or even overlaps with a raster of a synchronization signal of a service with an overlapping operating frequency, a user may be unable to distinguish the synchronization signal of a sidelink service from the synchronization signal of that service, leading to false demodulation of a synchronization signal of that service, and increasing a latency and power consumption.

It should be noted that, the sidelink service refers to a service performed on a sidelink, that is, a communication service performed on the sidelink, such as device-to-device (Device-to-Device, D2D) and vehicle-to-everything (Vehicle-to-Everything, V2X). V2X mainly includes vehicle-to-vehicle (Vehicle-to-Vehicle, V2V), vehicle-to-infrastructure (Vehicle-to-Infrastructure, V2I), vehicle-to-network (Vehicle-to-Network, V2N), and vehicle-to-pedestrian (Vehicle-to-Pedestrian, V2P).

To resolve the foregoing problem, as shown in FIG. 4, an embodiment of this disclosure provides a synchronization signal transmission method, applied to a terminal and including the following step:

Step 401: Transmit or receive a sidelink synchronization signal block.

The sidelink synchronization signal block includes: a primary sidelink synchronization signal (PSSS) and a secondary sidelink synchronization signal (SSSS), the PSSS and the SSSS being distributed in orthogonal frequency division multiplexing OFDM symbols occupied by the sidelink synchronization signal block.

It should be noted that, the transmitting or receiving a sidelink synchronization signal block includes both receiving a sidelink synchronization signal block and sending a sidelink synchronization signal block.

It should be noted that, the sidelink synchronization signal block also includes other channels, such as a broadcast channel and/or a service statement channel, and the sidelink synchronization signal block may also include reference signals, such as a DMRS and a sounding reference signal (Sounding reference signal, SRS).

It should also be noted that, when candidate time domain locations of at least two sidelink synchronization signal blocks are consecutive in time domain, and sidelink synchronization signal blocks have been transmitted and received at the candidate time domain locations of the at least two sidelink synchronization signal blocks (that is, transmission of sidelink synchronization signal blocks has been actually performed at the candidate time domain locations of the at least two sidelink synchronization signal blocks), transmission directions of the sidelink synchronization signal blocks at the candidate time domain locations of the at least two sidelink synchronization signal blocks are the same, which means that the terminal expects that a single transmission direction is maintained on these consecutive symbols, that is, all for sending or receiving.

It should also be noted that, when candidate time domain locations of two sidelink synchronization signal blocks are not consecutive in time domain, if transmission of sidelink synchronization signal blocks has been actually performed on the candidate time domain locations of the two sidelink synchronization signal blocks, and at least some symbols between candidate time domain locations of two adjacent sidelink synchronization signal blocks are used for setting a guard period (GP, guard period), transmission directions of the sidelink synchronization signal blocks actually transmitted or received on the candidate time domain locations of the two adjacent sidelink synchronization signal blocks may be different, which means that it is possible that both are for sending, or both are for receiving, or one for sending and the other one for receiving.

Optionally, the sidelink synchronization signal block is transmitted or received within one time window, and in this case, a transmission time of the sidelink synchronization signal block is called one time window.

Optionally, the sidelink synchronization signal block is transmitted or received within a preset time window, and in this case, the sidelink synchronization signal block can only be transmitted or received within the preset time window.

It should be further noted that, the preset time window may be a time window pre-configured by a terminal vendor, or may be a time window agreed by a protocol, or may be a time window configured by a base station.

Specifically, the PSSS and the SSSS are distributed in the OFDM symbols occupied by the sidelink synchronization signal block according to a preset rule.

It should be noted that, a sidelink synchronization signal block may be transmitted or received based on a slot, or may be transmitted or received based on a sub-slot (or a mini-slot), that is, one slot includes at least candidate time domain locations of one sidelink synchronization signal block. The foregoing preset rule may vary when candidate time domain locations of a sidelink synchronization signal block included in one slot are different. Therefore, the following specifically describes the foregoing preset rule from a perspective of a number of candidate time domain locations of a sidelink synchronization signal block included in one slot.

1. One slot includes candidate time domain locations of at least two sidelink synchronization signal blocks.

Specifically, in this case, the preset rule includes at least one of the following:

one of the PSSS and the SSSS is located in the second symbol of a sidelink synchronization signal block, and the other of the PSSS and the SSSS is located in the fifth symbol of the sidelink synchronization signal block;

one of the PSSS and the SSSS is located in the second symbol of a sidelink synchronization signal block, and the other of the PSSS and the SSSS is located in the sixth symbol of the sidelink synchronization signal block;

one of the PSSS and the SSSS is located in the third symbol of a sidelink synchronization signal block, and the other of the PSSS and the SSSS is located in the sixth symbol of the sidelink synchronization signal block;

one of the PSSS and the SSSS is located in the fourth symbol of a sidelink synchronization signal block, and the other of the PSSS and the SSSS is located in the sixth symbol of the sidelink synchronization signal block; or, one of the PSSS and the SSSS is located in the third symbol of a sidelink synchronization signal block, and the other of the PSSS and the SSSS is located in the fifth symbol of the sidelink synchronization signal block.

Further, specific formation of the preset rule may vary depending on whether candidate time domain locations are related to a subcarrier spacing (SCS). Details are as follows.

A. Candidate time domain locations of a sidelink synchronization signal block are unrelated to a subcarrier spacing.

In this case, specific description is made by using an example in which one slot includes candidate time domain locations of two sidelink synchronization signal blocks.

Specifically, an OFDM symbol index corresponding to the first symbol of candidate time domain locations of each of the two sidelink synchronization signal blocks is 14n or 7+14n;

where $0 \leq n < m$, and m is a maximum number of slots occupied by a sidelink synchronization signal block; a manner of obtaining m is: m=maximum number of sidelink synchronization signal blocks in a specific frequency range/2; and n=0 corresponds to the first OFDM symbol of the first slot including the candidate time domain locations of the sidelink synchronization signal block.

A1. When a number of OFDM symbols occupied by a sidelink synchronization signal block is greater than or equal to 5, the preset rule is:

one of the PSSS and the SSSS is located in the second symbol of a sidelink synchronization signal block, and the other of the PSSS and the SSSS is located in the fifth symbol of the sidelink synchronization signal block.

It should be noted that, in this case, an OFDM symbol index corresponding to the first symbol of candidate time domain locations of the first sidelink synchronization signal block of two sidelink synchronization signal blocks in one slot is 0, and an OFDM symbol index corresponding to the first symbol of candidate time domain locations of the second sidelink synchronization signal block is 7. Therefore, in this case, when a number of OFDM symbols occupied by a sidelink synchronization signal block is equal to 5, 6, and 7, a PSSS of candidate time domain locations of the first sidelink synchronization signal block is located in a location of an OFDM symbol numbered 1, a PSSS of candidate time domain locations of the second sidelink synchronization signal block is located in a location of an OFDM symbol numbered 8, an SSSS of candidate time domain locations of the first sidelink synchronization signal block is located in a location of an OFDM symbol numbered 4, and an SSSS of candidate time domain locations of the second sidelink synchronization signal block is located in a location of an OFDM symbol numbered 11; or when an OFDM symbol number of an SSSS of candidate time domain locations of a sidelink synchronization signal block is less than an OFDM symbol number of a PSSS, an SSSS of candidate time domain locations of the first sidelink synchronization signal block is located in a location of an OFDM symbol numbered 1, an SSSS of candidate time domain locations of the second sidelink synchronization signal block is located in a location of an OFDM symbol numbered 8, a PSSS of candidate time domain locations of the first sidelink synchronization signal block is located in a location of an OFDM symbol numbered 4, and a PSSS of candidate time domain locations of the second sidelink synchronization signal block is located in a location of an OFDM symbol numbered 11.

As shown in FIG. 5, when a number of OFDM symbols occupied by a sidelink synchronization signal block is equal to 5, and one slot includes candidate time domain locations of two sidelink synchronization signal blocks, for the candidate time domain locations of the first sidelink synchronization signal block (that is, SL-SSB1) and the second sidelink synchronization signal block (that is, SL-SSB2), a PSSS is located in the second symbol of a sidelink synchronization signal block, and an SSSS is located in the fifth symbol of the sidelink synchronization signal block. To be specific, the PSSS of the SL-SSB1 is located in a location of an OFDM symbol numbered 1, the PSSS of the SL-SSB2 is located in a location of an OFDM symbol numbered 8, the SSSS of the SL-SSB1 is located in a location of an OFDM symbol numbered 4, and the SSSS of the SL-SSB2 is located in a location of an OFDM symbol numbered 11.

Optionally, in another case, locations of the PSSS and the SSSS are interchanged, that is, the SSSS is located in the second symbol of a sidelink synchronization signal block, and the PSSS is located in the fifth symbol of the sidelink synchronization signal block.

As shown in FIG. 6, when a number of OFDM symbols occupied by a sidelink synchronization signal block is equal to 6, and one slot includes candidate time domain locations of two sidelink synchronization signal blocks, for the candidate time domain locations of the first sidelink synchronization signal block (that is, SL-SSB1) and the second sidelink synchronization signal block (that is, SL-SSB2), a PSSS is located in the second symbol of a sidelink synchronization signal block, and an SSSS is located in the fifth symbol of the sidelink synchronization signal block. To be specific, the PSSS of the SL-SSB1 is located in a location of an OFDM symbol numbered 1, the PSSS of the SL-SSB2 is located in a location of an OFDM symbol numbered 8, the SSSS of the SL-SSB1 is located in a location of an OFDM symbol numbered 4, and the SSSS of the SL-SSB2 is located in a location of an OFDM symbol numbered 11.

Optionally, in another case, locations of the PSSS and the SSSS are interchanged, that is, the SSSS is located in the second symbol of a sidelink synchronization signal block, and the PSSS is located in the fifth symbol of the sidelink synchronization signal block.

A2. When a number of OFDM symbols occupied by a sidelink synchronization signal block is greater than or equal to 6, the preset rule is at least one of the following:

A21. One of the PSSS and the SSSS is located in the second symbol of a sidelink synchronization signal block, and the other of the PSSS and the SSSS is located in the sixth symbol of the sidelink synchronization signal block.

It should be noted that, in this case, an OFDM symbol index corresponding to the first symbol of candidate time domain locations of the first sidelink synchronization signal block of two sidelink synchronization signal blocks in one slot is 0, and an OFDM symbol index corresponding to the first symbol of candidate time domain locations of the second sidelink synchronization signal block is 7. Therefore, in this case, when a number of OFDM symbols occupied by a sidelink synchronization signal block is equal to 6 and 7, a PSSS of candidate time domain locations of the first sidelink synchronization signal block is located in a location of an OFDM symbol numbered 1, a PSSS of candidate time domain locations of the second sidelink synchronization signal block is located in a location of an OFDM symbol numbered 8, an SSSS of candidate time domain locations of the first sidelink synchronization signal block is located in a location of an OFDM symbol numbered 5, and an SSSS of candidate time domain locations of the second sidelink synchronization signal block is located in a location of an OFDM symbol numbered 12; or when an OFDM symbol number of an SSSS of candidate time domain locations of a sidelink synchronization signal block is less than an OFDM symbol number of a PSSS, an SSSS of candidate time domain locations of the first sidelink synchronization signal block is located in a location of an OFDM symbol numbered 1, an SSSS of candidate time domain locations of the second sidelink synchronization signal block is located in a location of an OFDM symbol numbered 8, a PSSS of candidate time domain locations of the first sidelink synchronization signal block is located in a location of an OFDM symbol numbered 5, and a PSSS of candidate time domain locations of the second sidelink synchronization signal block is located in a location of an OFDM symbol numbered 12.

As shown in FIG. 7, when a number of OFDM symbols occupied by a sidelink synchronization signal block is equal to 6, and one slot includes candidate time domain locations of two sidelink synchronization signal blocks, for the candidate time domain locations of the first sidelink synchronization signal block (that is, SL-SSB1) and the second sidelink synchronization signal block (that is, SL-SSB2), a PSSS is located in the second symbol of a sidelink synchronization signal block, and an SSSS is located in the sixth symbol of the sidelink synchronization signal block. To be specific, the PSSS of the SL-SSB1 is located in a location of an OFDM symbol numbered 1, the PSSS of the SL-SSB2 is located in a location of an OFDM symbol numbered 8, the SSSS of the SL-SSB1 is located in a location of an OFDM symbol numbered 5, and the SSSS of the SL-SSB2 is located in a location of an OFDM symbol numbered 12.

Optionally, in another case, locations of the PSSS and the SSSS are interchanged, that is, the SSSS is located in the second symbol of a sidelink synchronization signal block, and the PSSS is located in the sixth symbol of the sidelink synchronization signal block.

A22. One of the PSSS and the SSSS is located in the third symbol of a sidelink synchronization signal block, and the other of the PSSS and the SSSS is located in the sixth symbol of the sidelink synchronization signal block.

It should be noted that, in this case, an OFDM symbol index corresponding to the first symbol of candidate time domain locations of the first sidelink synchronization signal block of two sidelink synchronization signal blocks in one slot is 0, and an OFDM symbol index corresponding to the first symbol of candidate time domain locations of the second sidelink synchronization signal block is 7. Therefore, in this case, when a number of OFDM symbols occupied by a sidelink synchronization signal block is equal to 6 and 7, a PSSS of candidate time domain locations of the first sidelink synchronization signal block is located in a location of an OFDM symbol numbered 2, a PSSS of candidate time domain locations of the second sidelink synchronization signal block is located in a location of an OFDM symbol numbered 9, an SSSS of candidate time domain locations of the first sidelink synchronization signal block is located in a location of an OFDM symbol numbered 5, and an SSSS of candidate time domain locations of the second sidelink synchronization signal block is located in a location of an OFDM symbol numbered 12; or when an OFDM symbol number of an SSSS of candidate time domain locations of a sidelink synchronization signal block is less than an OFDM symbol number of a PSSS, an SSSS of candidate time domain locations of the first sidelink synchronization signal block is located in a location of an OFDM symbol numbered 2, an SSSS of candidate time domain locations of the second sidelink synchronization signal block is located in a location of an OFDM symbol numbered 9, a PSSS of candidate time domain locations of the first sidelink synchronization signal block is located in a location of an OFDM symbol numbered 5, and a PSSS of candidate time domain locations of the second sidelink synchronization signal block is located in a location of an OFDM symbol numbered 12.

As shown in FIG. 8, when a number of OFDM symbols occupied by a sidelink synchronization signal block is equal to 6, and one slot includes candidate time domain locations of two sidelink synchronization signal blocks, for the candidate time domain locations of the first sidelink synchronization signal block (that is, SL-SSB1) and the second sidelink synchronization signal block (that is, SL-SSB2), a PSSS is located in the third symbol of a sidelink synchronization signal block, and an SSSS is located in the sixth symbol of the sidelink synchronization signal block. To be specific, the PSSS of the SL-SSB1 is located in a location of an OFDM symbol numbered 2, the PSSS of the SL-SSB2 is located in a location of an OFDM symbol numbered 9, the SSSS of the SL-SSB1 is located in a location of an OFDM symbol numbered 5, and the SSSS of the SL-SSB2 is located in a location of an OFDM symbol numbered 12.

Optionally, in another case, locations of the PSSS and the SSSS are interchanged, that is, the SSSS is located in the third symbol of a sidelink synchronization signal block, and the PSSS is located in the sixth symbol of the sidelink synchronization signal block.

A23. One of the PSSS and the SSSS is located in the fourth symbol of a sidelink synchronization signal block, and the other of the PSSS and the SSSS is located in the sixth symbol of the sidelink synchronization signal block.

It should be noted that, in this case, an OFDM symbol index corresponding to the first symbol of candidate time domain locations of the first sidelink synchronization signal block of two sidelink synchronization signal blocks in one slot is 0, and an OFDM symbol index corresponding to the first symbol of candidate time domain locations of the second sidelink synchronization signal block is 7. Therefore, in this case, when a number of OFDM symbols occupied by a sidelink synchronization signal block is equal to 6 and 7, a PSSS of candidate time domain locations of the first sidelink synchronization signal block is located in a location of an OFDM symbol numbered 3, a PSSS of candidate time domain locations of the second sidelink synchronization signal block is located in a location of an OFDM symbol numbered 10, an SSSS of candidate time domain locations of the first sidelink synchronization signal block is located in a location of an OFDM symbol numbered 5, and an SSSS of candidate time domain locations of the second sidelink synchronization signal block is located in a location of an OFDM symbol numbered 12; or when an OFDM symbol number of an SSSS of candidate time domain locations of a sidelink synchronization signal block is less than an OFDM symbol number of a PSSS, an SSSS of candidate time domain locations of the first sidelink synchronization signal block is located in a location of an OFDM symbol numbered 3, an SSSS of candidate time domain locations of the second sidelink synchronization signal block is located in a location of an OFDM symbol numbered 10, a PSSS of candidate time domain locations of the first sidelink synchronization signal block is located in a location of an OFDM symbol numbered 5, and a PSSS of candidate time domain locations of the second sidelink synchronization signal block is located in a location of an OFDM symbol numbered 12.

As shown in FIG. 9, when a number of OFDM symbols occupied by a sidelink synchronization signal block is equal to 6, and one slot includes candidate time domain locations of two sidelink synchronization signal blocks, for the candidate time domain locations of the first sidelink synchronization signal block (that is, SL-SSB1) and the second sidelink synchronization signal block (that is, SL-SSB2), a PSSS is located in the fourth symbol of a sidelink synchronization signal block, and an SSSS is located in the sixth symbol of the sidelink synchronization signal block. To be specific, the PSSS of the SL-SSB1 is located in a location of an OFDM symbol numbered 3, the PSSS of the SL-SSB2 is located in a location of an OFDM symbol numbered 10, the SSSS of the SL-SSB1 is located in a location of an OFDM symbol numbered 5, and the SSSS of the SL-SSB2 is located in a location of an OFDM symbol numbered 12.

Optionally, in another case, locations of the PSSS and the SSSS are interchanged, that is, the SSSS is located in the fourth symbol of a sidelink synchronization signal block, and the PSSS is located in the sixth symbol of the sidelink synchronization signal block.

B. Candidate time domain locations of the sidelink synchronization signal block are related to a subcarrier spacing.

B1. The subcarrier spacing is a first spacing.

When one slot includes candidate time domain locations of two sidelink synchronization signal blocks, an OFDM symbol index corresponding to the first symbol of candidate time domain locations of each of the two sidelink synchronization signal blocks is 14n or 7+14n;

where $0 \leq n < m$; m is a maximum number of slots occupied by a sidelink synchronization signal block; a manner of obtaining an m is: m=maximum number of sidelink synchronization signal blocks in a first spacing/2; and n=0 corresponds to the first OFDM symbol of the first slot including candidate time domain locations of a sidelink synchronization signal block.

B11. When a number of OFDM symbols occupied by a sidelink synchronization signal block is greater than or equal to 5, the preset rule is:

one of the PSSS and the SSSS is located in the second symbol of a sidelink synchronization signal block, and the other of the PSSS and the SSSS is located in the fifth symbol of the sidelink synchronization signal block.

It should be noted that, in this case, an OFDM symbol index corresponding to the first symbol of candidate time domain locations of the first sidelink synchronization signal block of two sidelink synchronization signal blocks in one slot is 0, and an OFDM symbol index corresponding to the first symbol of candidate time domain locations of the second sidelink synchronization signal block is 7. Therefore, in this case, when a number of OFDM symbols occupied by a sidelink synchronization signal block is equal to 5, 6, and 7, a PSSS of candidate time domain locations of the first sidelink synchronization signal block is located in a location of an OFDM symbol numbered 1, a PSSS of candidate time domain locations of the second sidelink synchronization signal block is located in a location of an OFDM symbol numbered 8, an SSSS of candidate time domain locations of the first sidelink synchronization signal block is located in a location of an OFDM symbol numbered 4, and an SSSS of candidate time domain locations of the second sidelink synchronization signal block is located in a location of an OFDM symbol numbered 11; or when an OFDM symbol number of an SSSS of candidate time domain locations of a sidelink synchronization signal block is less than an OFDM symbol number of a PSSS, an SSSS of candidate time domain locations of the first sidelink synchronization signal block is located in a location of an OFDM symbol numbered 1, an SSSS of candidate time domain locations of the second sidelink synchronization signal block is located in a location of an OFDM symbol numbered 8, a PSSS of candidate time domain locations of the first sidelink synchronization signal block is located in a location of an OFDM symbol numbered 4, and a PSSS of candidate time domain locations of the second sidelink synchronization signal block is located in a location of an OFDM symbol numbered 11.

Specifically, in this case, when a number of OFDM symbols occupied by a sidelink synchronization signal block is equal to 5, and an OFDM symbol number of a PSSS of candidate time domain locations of a sidelink synchronization signal block is less than an OFDM symbol number of an SSSS, reference may be made to FIG. 5 for distribution; when a number of OFDM symbols occupied by a sidelink synchronization signal block is equal to 6, and an OFDM symbol number of a PSSS of candidate time domain locations of a sidelink synchronization signal block is less than an OFDM symbol number of an SSSS, reference may be made to FIG. 6 for distribution.

B12. When a number of OFDM symbols occupied by a sidelink synchronization signal block is greater than or equal to 6, the preset rule is at least one of the following:

B121. One of the PSSS and the SSSS is located in the second symbol of a sidelink synchronization signal block, and the other of the PSSS and the SSSS is located in the sixth symbol of the sidelink synchronization signal block.

It should be noted that, in this case, an OFDM symbol index corresponding to the first symbol of candidate time domain locations of the first sidelink synchronization signal block of two sidelink synchronization signal blocks in one slot is 0, and an OFDM symbol index corresponding to the first symbol of candidate time domain locations of the second sidelink synchronization signal block is 7. Therefore, in this case, when a number of OFDM symbols occupied by a sidelink synchronization signal block is equal to 6 and 7, a PSSS of candidate time domain locations of the first sidelink synchronization signal block is located in a location of an OFDM symbol numbered 1, a PSSS of candidate time domain locations of the second sidelink synchronization signal block is located in a location of an OFDM symbol numbered 8, an SSSS of candidate time domain locations of the first sidelink synchronization signal block is located in a location of an OFDM symbol numbered 5, and an SSSS of candidate time domain locations of the second sidelink synchronization signal block is located in a location of an OFDM symbol numbered 12; or when an OFDM symbol number of an SSSS of candidate time domain locations of a sidelink synchronization signal block is less than an OFDM symbol number of a PSSS, an SSSS of candidate time domain locations of the first sidelink synchronization signal block is located in a location of an OFDM symbol numbered 1, an SSSS of candidate time domain locations of the second sidelink synchronization signal block is located in a location of an OFDM symbol numbered 8, a PSSS of candidate time domain locations of the first sidelink synchronization signal block is located in a location of an OFDM symbol numbered 5, and a PSSS of candidate time domain locations of the second sidelink synchronization signal block is located in a location of an OFDM symbol numbered 12.

Specifically, in this case, when a number of OFDM symbols occupied by a sidelink synchronization signal block is equal to 6, and an OFDM symbol number of a PSSS of candidate time domain locations of a sidelink synchronization signal block is less than an OFDM symbol number of an SSSS, reference may be made to FIG. 7 for distribution.

B122. One of the PSSS and the SSSS is located in the third symbol of a sidelink synchronization signal block, and the other of the PSSS and the SSSS is located in the sixth symbol of the sidelink synchronization signal block.

It should be noted that, in this case, an OFDM symbol index corresponding to the first symbol of candidate time domain locations of the first sidelink synchronization signal block of two sidelink synchronization signal blocks in one slot is 0, and an OFDM symbol index corresponding to the first symbol of candidate time domain locations of the second sidelink synchronization signal block is 7. Therefore, in this case, when a number of OFDM symbols occupied by a sidelink synchronization signal block is equal to 6 and 7, a PSSS of candidate time domain locations of the first sidelink synchronization signal block is located in a location of an OFDM symbol numbered 2, a PSSS of candidate time domain locations of the second sidelink synchronization signal block is located in a location of an OFDM symbol numbered 9, an SSSS of candidate time domain locations of the first sidelink synchronization signal block is located in a location of an OFDM symbol numbered 5, and an SSSS of candidate time domain locations of the second sidelink synchronization signal block is located in a location of an OFDM symbol numbered 12; or when an OFDM symbol number of an SSSS of candidate time domain locations of a sidelink synchronization signal block is less than an OFDM symbol number of a PSSS, an SSSS of candidate time domain locations of the first sidelink synchronization signal block is located in a location of an OFDM symbol numbered 2, an SSSS of candidate time domain locations of the second sidelink synchronization signal block is located in a location of an OFDM symbol numbered 9, a PSSS of candidate time domain locations of the first sidelink synchronization signal block is located in a location of an OFDM symbol numbered 5, and a PSSS of candidate time domain locations of the second sidelink synchronization signal block is located in a location of an OFDM symbol numbered 12.

Specifically, in this case, when a number of OFDM symbols occupied by a sidelink synchronization signal block is equal to 6, and an OFDM symbol number of a PSSS of candidate time domain locations of a sidelink synchronization signal block is less than an OFDM symbol number of an SSSS, reference may be made to FIG. 8 for distribution.

B123. One of the PSSS and the SSSS is located in the fourth symbol of a sidelink synchronization signal block, and the other of the PSSS and the SSSS is located in the sixth symbol of the sidelink synchronization signal block.

It should be noted that, in this case, an OFDM symbol index corresponding to the first symbol of candidate time domain locations of the first sidelink synchronization signal block of two sidelink synchronization signal blocks in one slot is 0, and an OFDM symbol index corresponding to the first symbol of candidate time domain locations of the second sidelink synchronization signal block is 7. Therefore, in this case, when a number of OFDM symbols occupied by a sidelink synchronization signal block is equal to 6 and 7, a PSSS of candidate time domain locations of the first sidelink synchronization signal block is located in a location of an OFDM symbol numbered 3, a PSSS of candidate time domain locations of the second sidelink synchronization signal block is located in a location of an OFDM symbol numbered 10, an SSSS of candidate time domain locations of the first sidelink synchronization signal block is located in a location of an OFDM symbol numbered 5, and an SSSS of candidate time domain locations of the second sidelink synchronization signal block is located in a location of an OFDM symbol numbered 12; or when an OFDM symbol number of an SSSS of candidate time domain locations of a sidelink synchronization signal block is less than an OFDM symbol number of a PSSS, an SSSS of candidate time domain locations of the first sidelink synchronization signal block is located in a location of an OFDM symbol numbered 3, an SSSS of candidate time domain locations of the second sidelink synchronization signal block is located in a location of an OFDM symbol numbered 10, a PSSS of candidate time domain locations of the first sidelink synchronization signal block is located in a location of an OFDM symbol numbered 5, and a PSSS of candidate time domain locations of the second sidelink synchronization signal block is located in a location of an OFDM symbol numbered 12.

Specifically, in this case, when a number of OFDM symbols occupied by a sidelink synchronization signal block is equal to 6, and an OFDM symbol number of a PSSS of candidate time domain locations of a sidelink synchronization signal block is less than an OFDM symbol number of an SSSS, reference may be made to FIG. 9 for distribution.

B2. The subcarrier spacing is a second spacing.

When one slot includes candidate time domain locations of two sidelink synchronization signal blocks, an OFDM symbol index corresponding to the first symbol of candidate time domain locations of each of the two sidelink synchronization signal blocks is x+14n or y+14n;

where $0 \leq n < m$; m is a maximum number of slots occupied by a sidelink synchronization signal block; a manner of obtaining an m is: m=maximum number of sidelink synchronization signal blocks in a second spacing/2; and n=0 corresponds to the first OFDM symbol of the first slot including candidate time domain locations of a sidelink synchronization signal block, a value of x is set to 0, and a value of y is set to 6 or 7, where y=7 when the second spacing is 120 kHz.

B21. When a number of OFDM symbols occupied by a sidelink synchronization signal block is greater than or equal to 6, the preset rule is at least one of the following:

B211. One of the PSSS and the SSSS is located in the third symbol of a sidelink synchronization signal block, and the other of the PSSS and the SSSS is located in the sixth symbol of the sidelink synchronization signal block;

As shown in FIG. 10, when a number of OFDM symbols occupied by a sidelink synchronization signal block is equal to 6, and one slot includes candidate time domain locations of two sidelink synchronization signal blocks, for the candidate time domain locations of the first sidelink synchronization signal block (that is, SL-SSB1) and the second sidelink synchronization signal block (that is, SL-SSB2), a PSSS is located in the third symbol of a sidelink synchronization signal block, and an SSSS is located in the sixth symbol of the sidelink synchronization signal block. To be specific, the PSSS of the SL-SSB1 is located in a location of an OFDM symbol numbered 2, the PSSS of the SL-SSB2 is located in a location of an OFDM symbol numbered 8, the SSSS of the SL-SSB1 is located in a location of an OFDM symbol numbered 5, and the SSSS of the SL-SSB2 is located in a location of an OFDM symbol numbered 11.

Optionally, in another case, locations of the PSSS and the SSSS are interchanged, that is, the SSSS is located in the third symbol of a sidelink synchronization signal block, and the PSSS is located in the sixth symbol of the sidelink synchronization signal block.

B212. One of the PSSS and the SSSS is located in the fourth symbol of a sidelink synchronization signal block, and the other of the PSSS and the SSSS is located in the sixth symbol of the sidelink synchronization signal block.

Figure 11:
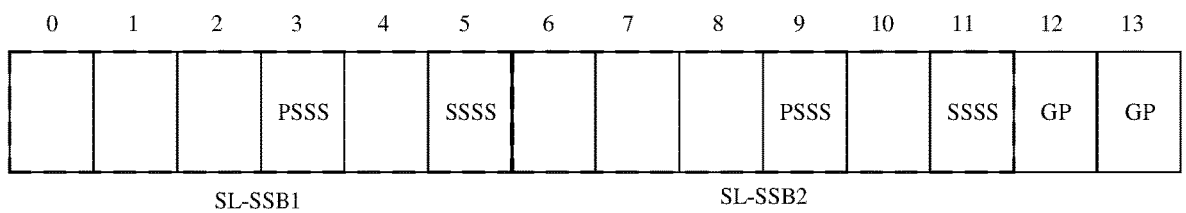
FIG. 11 is a seventh schematic diagram showing distribution of PSSSs and SSSSs in one slot.

As shown in FIG. 11, when a number of OFDM symbols occupied by a sidelink synchronization signal block is equal to 6, and one slot includes candidate time domain locations of two sidelink synchronization signal blocks, for the candidate time domain locations of the first sidelink synchronization signal block (that is, SL-SSB1) and the second sidelink synchronization signal block (that is, SL-SSB2), a PSSS is located in the fourth symbol of a sidelink synchronization signal block, and an SSSS is located in the sixth symbol of the sidelink synchronization signal block. To be specific, the PSSS of the SL-SSB1 is located in a location of an OFDM symbol numbered 3, the PSSS of the SL-SSB2 is located in a location of an OFDM symbol numbered 9, the SSSS of the SL-SSB1 is located in a location of an OFDM symbol numbered 5, and the SSSS of the SL-SSB2 is located in a location of an OFDM symbol numbered 11.

Optionally, in another case, locations of the PSSS and the SSSS are interchanged, that is, the SSSS is located in the fourth symbol of a sidelink synchronization signal block, and the PSSS is located in the sixth symbol of the sidelink synchronization signal block.

B22. When the second spacing includes 120 kHz, and a number of OFDM symbols occupied by a sidelink synchronization signal block is greater than or equal to 5, the preset rule is:

one of the PSSS and the SSSS is located in the third symbol of a sidelink synchronization signal block, and the other of the PSSS and the SSSS is located in the fifth symbol of the sidelink synchronization signal block.

It should be noted that, in this case, an OFDM symbol index corresponding to the first symbol of candidate time domain locations of the first sidelink synchronization signal block of two sidelink synchronization signal blocks in one slot is 0, and an OFDM symbol index corresponding to the first symbol of candidate time domain locations of the second sidelink synchronization signal block is 7. Therefore, in this case, when a number of OFDM symbols occupied by a sidelink synchronization signal block is equal to 5, 6, and 7, a PSSS of candidate time domain locations of the first sidelink synchronization signal block is located in a location of an OFDM symbol numbered 2, a PSSS of candidate time domain locations of the second sidelink synchronization signal block is located in a location of an OFDM symbol numbered 9, an SSSS of candidate time domain locations of the first sidelink synchronization signal block is located in a location of an OFDM symbol numbered 4, and an SSSS of candidate time domain locations of the second sidelink synchronization signal block is located in a location of an OFDM symbol numbered 11; or when an OFDM symbol number of an SSSS of candidate time domain locations of a sidelink synchronization signal block is less than an OFDM symbol number of a PSSS, an SSSS of candidate time domain locations of the first sidelink synchronization signal block is located in a location of an OFDM symbol numbered 2, an SSSS of candidate time domain locations of the second sidelink synchronization signal block is located in a location of an OFDM symbol numbered 9, a PSSS of candidate time domain locations of the first sidelink synchronization signal block is located in a location of an OFDM symbol numbered 4, and a PSSS of candidate time domain locations of the second sidelink synchronization signal block is located in a location of an OFDM symbol numbered 11.

Figure 12:
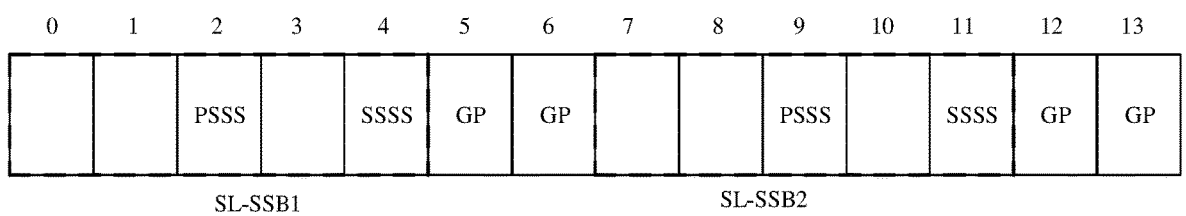
FIG. 12 is an eighth schematic diagram showing distribution of PSSSs and SSSSs in one slot.

As shown in FIG. 12, when a number of OFDM symbols occupied by a sidelink synchronization signal block is equal to 5, and one slot includes candidate time domain locations of two sidelink synchronization signal blocks, for the candidate time domain locations of the first sidelink synchronization signal block (that is, SL-SSB1) and the second sidelink synchronization signal block (that is, SL-SSB2), a PSSS is located in the third symbol of a sidelink synchronization signal block, and an SSSS is located in the fifth symbol of the sidelink synchronization signal block. To be specific, the PSSS of the SL-SSB1 is located in a location of an OFDM symbol numbered 2, the PSSS of the SL-SSB2 is located in a location of an OFDM symbol numbered 9, the SSSS of the SL-SSB1 is located in a location of an OFDM symbol numbered 4, and the SSSS of the SL-SSB2 is located in a location of an OFDM symbol numbered 11.

Optionally, in another case, locations of the PSSS and the SSSS are interchanged, that is, the SSSS is located in the third symbol of a sidelink synchronization signal block, and the PSSS is located in the fifth symbol of the sidelink synchronization signal block.

It should be noted that, frequencies contained in the foregoing first spacing and second spacing are at least partly different. For example, of 15 kHz, 30 kHz, 60 kHz, 120 kHz, and 240 kHz, some are grouped to the first spacing, and the others are grouped to the second spacing. For example, the first spacing includes: 15 kHz and 30 kHz, and the second spacing includes: 60 kHz, 120 kHz, and 240 kHz. It should be noted that the foregoing description is only one grouping of the first spacing and the second spacing, and does not serve as a limitation in practical applications.

C. When the subcarrier spacing is not considered

Specifically, the preset rule includes:

one of the PSSS and the SSSS is located in the third symbol of a sidelink synchronization signal block, and the other of the PSSS and the SSSS is located in the fifth symbol of the sidelink synchronization signal block.

It should be noted that, in this case, an OFDM symbol index corresponding to the first symbol of candidate time domain locations of the first sidelink synchronization signal block of two sidelink synchronization signal blocks in one slot is 0, and an OFDM symbol index corresponding to the first symbol of candidate time domain locations of the second sidelink synchronization signal block is 7. Therefore, in this case, when a number of OFDM symbols occupied by a sidelink synchronization signal block is equal to 5, 6, and 7, a PSSS of candidate time domain locations of the first sidelink synchronization signal block is located in a location of an OFDM symbol numbered 2, a PSSS of candidate time domain locations of the second sidelink synchronization signal block is located in a location of an OFDM symbol numbered 9, an SSSS of candidate time domain locations of the first sidelink synchronization signal block is located in a location of an OFDM symbol numbered 4, and an SSSS of candidate time domain locations of the second sidelink synchronization signal block is located in a location of an OFDM symbol numbered 11; or when an OFDM symbol number of an SSSS of candidate time domain locations of a sidelink synchronization signal block is less than an OFDM symbol number of a PSSS, an SSSS of candidate time domain locations of the first sidelink synchronization signal block is located in a location of an OFDM symbol numbered 2, an SSSS of candidate time domain locations of the second sidelink synchronization signal block is located in a location of an OFDM symbol numbered 9, a PSSS of candidate time domain locations of the first sidelink synchronization signal block is located in a location of an OFDM symbol numbered 4, and a PSSS of candidate time domain locations of the second sidelink synchronization signal block is located in a location of an OFDM symbol numbered 11.

When a number of OFDM symbols occupied by a sidelink synchronization signal block is equal to 5, and one slot includes two sidelink synchronization signal blocks, and when an OFDM symbol number of a PSSS of candidate time domain locations of a sidelink synchronization signal block is less than an OFDM symbol number of an SSSS, reference may be made to FIG. 12 for distribution.

Figure 13:
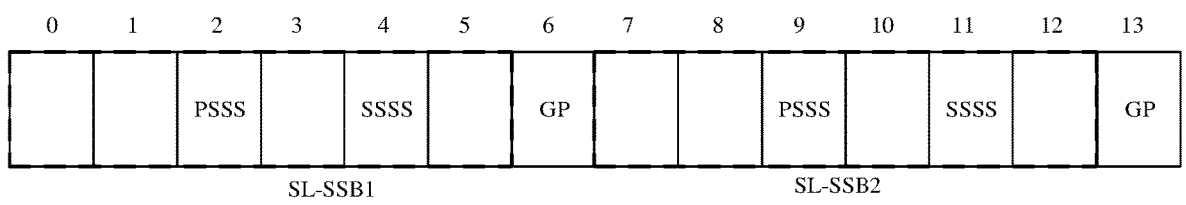
FIG. 13 is a ninth schematic diagram showing distribution of PSSSs and SSSSs in one slot.

As shown in FIG. 13, when a number of OFDM symbols occupied by a sidelink synchronization signal block is equal to 6, and one slot includes candidate time domain locations of two sidelink synchronization signal blocks, for the candidate time domain locations of the first sidelink synchronization signal block (that is, SL-SSB1) and the second sidelink synchronization signal block (that is, SL-SSB2), a PSSS is located in the third symbol of a sidelink synchronization signal block, and an SSSS is located in the fifth symbol of the sidelink synchronization signal block. To be specific, the PSSS of the SL-SSB1 is located in a location of an OFDM symbol numbered 2, the PSSS of the SL-SSB2 is located in a location of an OFDM symbol numbered 9, the SSSS of the SL-SSB1 is located in a location of an OFDM symbol numbered 4, and the SSSS of the SL-SSB2 is located in a location of an OFDM symbol numbered 11.

Optionally, in another case, locations of the PSSS and the SSSS are interchanged, that is, the SSSS is located in the third symbol of a sidelink synchronization signal block, and the PSSS is located in the fifth symbol of the sidelink synchronization signal block.

2. One slot includes candidate time domain locations of one sidelink synchronization signal block.

It should be noted that, in this case, it can be understood as there is no concept of sidelink synchronization signal block, that is, a PSSS and an SSSS are distributed directly according to locations of OFDM symbols.

Specifically, in this case, the preset rule includes at least one of the following:

one of the PSSS and the SSSS is located in the third and fourth OFDM symbols of one slot, and the other of the PSSS and the SSSS is located in the eleventh and twelfth OFDM symbols of one slot;

one of the PSSS and the SSSS is located in the second and third OFDM symbols of one slot, and the other of the PSSS and the SSSS is located in the twelfth and thirteenth OFDM symbols of one slot;

one of the PSSS and the SSSS is located in the fifth and seventh OFDM symbols of one slot, and the other of the PSSS and the SSSS is located in the tenth and twelfth OFDM symbols of one slot;

one of the PSSS and the SSSS is located in the third and sixth OFDM symbols of one slot, and the other of the PSSS and the SSSS is located in the ninth and twelfth OFDM symbols of one slot;

one of the PSSS and the SSSS is located in the second and ninth OFDM symbols of one slot, and the other of the PSSS and the SSSS is located in the fifth and twelfth OFDM symbols of one slot;

one of the PSSS and the SSSS is located in the second and ninth OFDM symbols of one slot, and the other of the PSSS and the SSSS is located in the sixth and thirteenth OFDM symbols of one slot;

one of the PSSS and the SSSS is located in the third and tenth OFDM symbols of one slot, and the other of the PSSS and the SSSS is located in the sixth and thirteenth OFDM symbols of one slot;

one of the PSSS and the SSSS is located in the fourth and eleventh OFDM symbols of one slot, and the other of the PSSS and the SSSS is located in the sixth and thirteenth OFDM symbols of one slot;

one of the PSSS and the SSSS is located in the third and ninth OFDM symbols of one slot, and the other of the PSSS and the SSSS is located in the sixth and twelfth OFDM symbols of one slot;

one of the PSSS and the SSSS is located in the fourth and tenth OFDM symbols of one slot, and the other of the PSSS and the SSSS is located in the sixth and twelfth OFDM symbols of one slot; or, one of the PSSS and the SSSS is located in the third and tenth OFDM symbols of one slot, and the other of the PSSS and the SSSS is located in the fifth and twelfth OFDM symbols of one slot.

D. Candidate time domain locations of a sidelink synchronization signal block are unrelated to a subcarrier spacing.

In this case, the preset rule is at least one of the following:

D1. One of the PSSS and the SSSS is located in the third and fourth OFDM symbols of one slot, and the other of the PSSS and the SSSS is located in the eleventh and twelfth OFDM symbols of one slot;

As shown in FIG. 14, one slot includes candidate time domain locations of at most one sidelink synchronization signal block, where the PSSS is located in the third and fourth OFDM symbols, and the SSSS is located in the eleventh and twelfth OFDM symbols, that is, the PSSS is located in locations of OFDM symbols numbered 2 and 3, and the SSSS is located in locations of OFDM symbols numbered 10 and 11.

Optionally, in another case, locations of the PSSS and the SSSS are interchanged, that is, the SSSS is located in locations of OFDM symbols numbered 2 and 3, and the PSSS is located in locations of OFDM symbols numbered 10 and 11.

It should also be noted that, in this case, the sixth and ninth OFDM symbols of one slot are used for transmitting or receiving a demodulation reference signal, that is, locations of OFDM symbols numbered 5 and 8 are used for transmitting or receiving a demodulation reference signal.

D2. One of the PSSS and the SSSS is located in the second and third OFDM symbols of one slot, and the other of the PSSS and the SSSS is located in the twelfth and thirteenth OFDM symbols of one slot.

As shown in FIG. 15, one slot includes candidate time domain locations of at most one sidelink synchronization signal block, where the PSSS is located in the second and third OFDM symbols, and the SSSS is located in the twelfth and thirteenth OFDM symbols, that is, the PSSS is located in locations of OFDM symbols numbered 1 and 2, and the SSSS is located in locations of OFDM symbols numbered 11 and 12.

Optionally, in another case, locations of the PSSS and the SSSS are interchanged, that is, the SSSS is located in locations of OFDM symbols numbered 1 and 2, and the PSSS is located in locations of OFDM symbols numbered 11 and 12.

It should also be noted that, in this case, the sixth and ninth OFDM symbols of one slot are used for transmitting or receiving a demodulation reference signal, that is, locations of OFDM symbols numbered 5 and 8 are used for transmitting or receiving a demodulation reference signal.

D3. One of the PSSS and the SSSS is located in the fifth and seventh OFDM symbols of one slot, and the other of the PSSS and the SSSS is located in the tenth and twelfth OFDM symbols of one slot.

As shown in FIG. 16, one slot includes candidate time domain locations of at most one sidelink synchronization signal block, where the PSSS is located in the fifth and seventh OFDM symbols, and the SSSS is located in the tenth and twelfth OFDM symbols, that is, the PSSS is located in locations of OFDM symbols numbered 4 and 6, and the SSSS is located in locations of OFDM symbols numbered 9 and 11.

Optionally, in another case, locations of the PSSS and the SSSS are interchanged, that is, the SSSS is located in locations of OFDM symbols numbered 4 and 6, and the PSSS is located in locations of OFDM symbols numbered 9 and 11.

D4. One of the PSSS and the SSSS is located in the second and ninth OFDM symbols of one slot, and the other of the PSSS and the SSSS is located in the fifth and twelfth OFDM symbols of one slot.

D5. One of the PSSS and the SSSS is located in the second and ninth OFDM symbols of one slot, and the other of the PSSS and the SSSS is located in the sixth and thirteenth OFDM symbols of one slot.

D6. One of the PSSS and the SSSS is located in the third and tenth OFDM symbols of one slot, and the other of the PSSS and the SSSS is located in the sixth and thirteenth OFDM symbols of one slot.

D7. One of the PSSS and the SSSS is located in the fourth and eleventh OFDM symbols of one slot, and the other of the PSSS and the SSSS is located in the sixth and thirteenth OFDM symbols of one slot.

E. Candidate time domain locations of the sidelink synchronization signal block are related to a subcarrier spacing.

E1. The subcarrier spacing is a third spacing.

In this case, the preset rule is at least one of the following:

E11. One of the PSSS and the SSSS is located in the third and sixth OFDM symbols of one slot, and the other of the PSSS and the SSSS is located in the ninth and twelfth OFDM symbols of one slot.

As shown in FIG. 17, one slot includes candidate time domain locations of at most one sidelink synchronization signal block, where the PSSS is located in the third and sixth OFDM symbols, and the SSSS is located in the ninth and twelfth OFDM symbols, that is, the PSSS is located in locations of OFDM symbols numbered 2 and 5, and the SSSS is located in locations of OFDM symbols numbered 8 and 11.

Optionally, in another case, locations of the PSSS and the SSSS are interchanged, that is, the SSSS is located in locations of OFDM symbols numbered 2 and 5, and the PSSS is located in locations of OFDM symbols numbered 8 and 11.

E12. One of the PSSS and the SSSS is located in the second and ninth OFDM symbols of one slot, and the other of the PSSS and the SSSS is located in the fifth and twelfth OFDM symbols of one slot.

E13. One of the PSSS and the SSSS is located in the second and ninth OFDM symbols of one slot, and the other of the PSSS and the SSSS is located in the sixth and thirteenth OFDM symbols of one slot.

E14. One of the PSSS and the SSSS is located in the third and tenth OFDM symbols of one slot, and the other of the PSSS and the SSSS is located in sixth and thirteenth OFDM symbols of one slot.

E15. One of the PSSS and the SSSS is located in the fourth and eleventh OFDM symbols of one slot, and the other of the PSSS and the SSSS is located in the sixth and thirteenth OFDM symbols of one slot.

E2. The subcarrier spacing is a fourth spacing.

In this case, the preset rule is at least one of the following:

E21. One of the PSSS and the SSSS is located in the third and fourth OFDM symbols of one slot, and the other of the PSSS and the SSSS is located in the eleventh and twelfth OFDM symbols of one slot.

Specifically, in this case, when an OFDM symbol number of a PSSS of candidate time domain locations of a sidelink synchronization signal block is less than an OFDM symbol number of an SSSS, reference may be made to FIG. 14 for distribution.

E22. One of the PSSS and the SSSS is located in the third and ninth OFDM symbols of one slot, and the other of the PSSS and the SSSS is located in the sixth and twelfth OFDM symbols of one slot.

E23. One of the PSSS and the SSSS is located in the fourth and tenth OFDM symbols of one slot, and the other of the PSSS and the SSSS is located in the sixth and twelfth OFDM symbols of one slot.

E24. One of the PSSS and the SSSS is located in the third and tenth OFDM symbols of one slot, and the other of the PSSS and the SSSS is located in the fifth and twelfth OFDM symbols of one slot.

It should be noted that, frequencies contained in the foregoing third spacing and fourth spacing are at least partly different. For example, of 15 kHz, 30 kHz, 60 kHz, 120 kHz, and 240 kHz, some are grouped to the third spacing, and the others are grouped to the fourth spacing. For example, the third spacing includes: 15 kHz and 30 kHz, and the fourth spacing includes: 60 kHz, 120 kHz, and 240 kHz. It should be noted that the foregoing description is only one grouping of the third spacing and the fourth spacing, and does not serve as a limitation in practical applications.

It should also be noted that, the PSSS employs an M-sequence corresponding to a polynomial different from the NR PSS.

Further, the M-sequence includes (that is, the sequence of the PSSS is $d_{pass}(n)$):

$$d_{psss}(n)=1-2x(m)$$

$$m=(n+XN_{ID}^{SL(2)}) \bmod 127$$

$$0 \leq n < 127$$

$$x(i+7)=(x(i+1)+x(i)) \bmod 2$$

$$[x(6)x(5)x(4)x(3)x(2)x(1)x(0)]=[0000001]$$

where $d_{psss}(n)$ is the M-sequence; n is an index of the M-sequence; m is an index of the sequence x, $N_{ID}^{SL(2)}$ is a group ID of a sidelink synchronization ID, X is a cyclic shift, and one optional value of X is X=43; x(m) is obtained by using the equation x(i+7)=(x(i+1)+x(i)) mod 2, and the sequence x is initialized as: [x(6) x(5) x(4) x(3) x(2) x(1) x(0)]=[000001].

It should be noted that, symbol locations marked with a GP in FIG. 5 to FIG. 17 may be left empty and not used for data transmission, or may be used for other purposes, and only one case in which these symbol locations are used as GPs is shown in each of the figures.

It should be noted that, the embodiments of this disclosure can improve network communication process, ensure reliability of network communication, and avoid a problem that a terminal mixes up synchronization signals of different services when a sidelink operating frequency band overlaps with an operating frequency band of another service, ensuring good demodulation performance, such that a terminal can find a sidelink synchronization signal and/or a broadcast channel quickly in different frequency bands, and power consumption is reduced.

Figure 18:
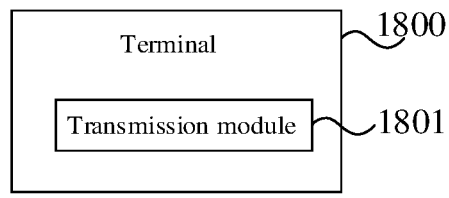
FIG. 18 is a schematic modular diagram of a terminal according to an embodiment of this disclosure.

As shown in FIG. 18, an embodiment of this disclosure further provides a terminal 1800, including:

a transmission module 1801, configured to transmit or receive a sidelink synchronization signal block;

where the sidelink synchronization signal block includes: a primary sidelink synchronization signal PSSS and a secondary sidelink synchronization signal SSSS, the PSSS and the SSSS being distributed in orthogonal frequency division multiplexing OFDM symbols occupied by the sidelink synchronization signal block.

Specifically, the PSSS and the SSSS are distributed in the OFDM symbols occupied by the sidelink synchronization signal block according to a preset rule.

Optionally, when one slot includes candidate time domain locations of at least two sidelink synchronization signal blocks, the preset rule includes at least one of the following:

one of the PSSS and the SSSS is located in the second symbol of a sidelink synchronization signal block, and the other of the PSSS and the SSSS is located in the fifth symbol of the sidelink synchronization signal block;

one of the PSSS and the SSSS is located in the second symbol of a sidelink synchronization signal block, and the other of the PSSS and the SSSS is located in the sixth symbol of the sidelink synchronization signal block;

one of the PSSS and the SSSS is located in the third symbol of a sidelink synchronization signal block, and the other of the PSSS and the SSSS is located in the sixth symbol of the sidelink synchronization signal block;

one of the PSSS and the SSSS is located in the fourth symbol of a sidelink synchronization signal block, and the other of the PSSS and the SSSS is located in the sixth symbol of the sidelink synchronization signal block; or, one of the PSSS and the SSSS is located in the third symbol of a sidelink synchronization signal block, and the other of the PSSS and the SSSS is located in the fifth symbol of the sidelink synchronization signal block.

Further, when one slot includes candidate time domain locations of two sidelink synchronization signal blocks, an OFDM symbol index corresponding to the first symbol of candidate time domain locations of each of the two sidelink synchronization signal blocks is 14n or 7+14n, where 0≤n<m; m is a maximum number of slots occupied by a sidelink synchronization signal block; and n=0 corresponds to the first OFDM symbol of the first slot including candidate time domain locations of a sidelink synchronization signal block.

Further, when a number of OFDM symbols occupied by a sidelink synchronization signal block is greater than or equal to 5, the preset rule is:

one of the PSSS and the SSSS is located in the second symbol of a sidelink synchronization signal block, and the other of the PSSS and the SSSS is located in the fifth symbol of the sidelink synchronization signal block.

Further, when candidate time domain locations of the sidelink synchronization signal block are unrelated to a subcarrier spacing, and a number of OFDM symbols occupied by a sidelink synchronization signal block is greater than or equal to 6, the preset rule is at least one of the following:

one of the PSSS and the SSSS is located in the second symbol of a sidelink synchronization signal block, and the other of the PSSS and the SSSS is located in the sixth symbol of the sidelink synchronization signal block;

one of the PSSS and the SSSS is located in the third symbol of a sidelink synchronization signal block, and the other of the PSSS and the SSSS is located in the sixth symbol of the sidelink synchronization signal block; or, one of the PSSS and the SSSS is located in the fourth symbol of a sidelink synchronization signal block, and the other of the PSSS and the SSSS is located in the sixth symbol of the sidelink synchronization signal block.

Further, when the subcarrier spacing is the first spacing, and one slot includes candidate time domain locations of two sidelink synchronization signal blocks, an OFDM symbol index corresponding to the first symbol of candidate time domain locations of each of the two sidelink synchronization signal blocks is 14n or 7+14n; and where $0 \leq n < m$; m is a maximum number of slots occupied by a sidelink synchronization signal block; and n=0 corresponds to the first OFDM symbol of the first slot including candidate time domain locations of a sidelink synchronization signal block.

Further, when the subcarrier spacing is the first spacing, and a number of OFDM symbols occupied by a sidelink synchronization signal block is greater than or equal to 5, the preset rule is:

one of the PSSS and the SSSS is located in the second symbol of a sidelink synchronization signal block, and the other of the PSSS and the SSSS is located in the fifth symbol of the sidelink synchronization signal block.

Further, when the subcarrier spacing is the first spacing, and a number of OFDM symbols occupied by a sidelink synchronization signal block is greater than or equal to 6, the preset rule is at least one of the following:

one of the PSSS and the SSSS is located in the second symbol of a sidelink synchronization signal block, and the other of the PSSS and the SSSS is located in the sixth symbol of the sidelink synchronization signal block;

one of the PSSS and the SSSS is located in the third symbol of a sidelink synchronization signal block, and the other of the PSSS and the SSSS is located in the sixth symbol of the sidelink synchronization signal block; or, one of the PSSS and the SSSS is located in the fourth symbol of a sidelink synchronization signal block, and the other of the PSSS and the SSSS is located in the sixth symbol of the sidelink synchronization signal block.

Further, when candidate time domain locations of the sidelink synchronization signal block are related to a subcarrier spacing, the subcarrier spacing is the second spacing, and one slot includes candidate time domain locations of two sidelink synchronization signal blocks, an OFDM symbol index corresponding to the first symbol of candidate time domain locations of each of the two sidelink synchronization signal blocks is x+14n or y+14n, where $0 \leq n < m$; m is a maximum number of slots occupied by a sidelink synchronization signal block; and n=0 corresponds to the first OFDM symbol of the first slot including candidate time domain locations of a sidelink synchronization signal block, a value of x is set to 0, and a value of y is set to 6 or 7.

Further, when the subcarrier spacing is the second spacing, and a number of OFDM symbols occupied by a sidelink synchronization signal block is greater than or equal to 6, the preset rule is at least one of the following:

one of the PSSS and the SSSS is located in the third symbol of a sidelink synchronization signal block, and the other of the PSSS and the SSSS is located in the sixth symbol of the sidelink synchronization signal block; or, one of the PSSS and the SSSS is located in the fourth symbol of a sidelink synchronization signal block, and the other of the PSSS and the SSSS is located in the sixth symbol of the sidelink synchronization signal block.

Further, when the subcarrier spacing includes 120 kHz, and a number of OFDM symbols occupied by a sidelink synchronization signal block is greater than or equal to 5, the preset rule is:

one of the PSSS and the SSSS is located in the third symbol of a sidelink synchronization signal block, and the other of the PSSS and the SSSS is located in the fifth symbol of the sidelink synchronization signal block.

Optionally, the preset rule includes:

one of the PSSS and the SSSS is located in the third symbol of a sidelink synchronization signal block, and the other of the PSSS and the SSSS is located in the fifth symbol of the sidelink synchronization signal block.

Optionally, when one slot includes candidate time domain locations of a sidelink synchronization signal block, the preset rule includes at least one of the following:

one of the PSSS and the SSSS is located in the third and fourth OFDM symbols of one slot, and the other of the PSSS and the SSSS is located in the eleventh and twelfth OFDM symbols of one slot;

one of the PSSS and the SSSS is located in the second and third OFDM symbols of one slot, and the other of the PSSS and the SSSS is located in the twelfth and thirteenth OFDM symbols of one slot;

one of the PSSS and the SSSS is located in the fifth and seventh OFDM symbols of one slot, and the other of the PSSS and the SSSS is located in the tenth and twelfth OFDM symbols of one slot;

one of the PSSS and the SSSS is located in the third and sixth OFDM symbols of one slot, and the other of the PSSS and the SSSS is located in the ninth and twelfth OFDM symbols of one slot;

one of the PSSS and the SSSS is located in the second and ninth OFDM symbols of one slot, and the other of the PSSS and the SSSS is located in the fifth and twelfth OFDM symbols of one slot;

one of the PSSS and the SSSS is located in the second and ninth OFDM symbols of one slot, and the other of the PSSS and the SSSS is located in the sixth and thirteenth OFDM symbols of one slot;

one of the PSSS and the SSSS is located in the third and tenth OFDM symbols of one slot, and the other of the PSSS and the SSSS is located in the sixth and thirteenth OFDM symbols of one slot;

one of the PSSS and the SSSS is located in the fourth and eleventh OFDM symbols of one slot, and the other of the PSSS and the SSSS is located in the sixth and thirteenth OFDM symbols of one slot;

one of the PSSS and the SSSS is located in the third and ninth OFDM symbols of one slot, and the other of the PSSS and the SSSS is located in the sixth and twelfth OFDM symbols of one slot;

one of the PSSS and the SSSS is located in the fourth and tenth OFDM symbols of one slot, and the other of the PSSS and the SSSS is located in the sixth and twelfth OFDM symbols of one slot; or, one of the PSSS and the SSSS is located in the third and tenth OFDM symbols of one slot, and the other of the PSSS and the SSSS is located in the fifth and twelfth OFDM symbols of one slot.

Further, when the preset rule is: one of the PSSS and the SSSS is located in the third and fourth OFDM symbols of one slot, and the other of the PSSS and the SSSS is located in the eleventh and twelfth OFDM symbols of one slot; or when one of the PSSS and the SSSS is located in the second and third OFDM symbols of one slot, and the other of the PSSS and the SSSS is located in the twelfth and thirteenth OFDM symbols of one slot, the sixth and ninth OFDM symbols of one slot is used for transmitting or receiving a demodulation reference signal.

Further, when the subcarrier spacing is the third spacing, the preset rule is at least one of the following:

one of the PSSS and the SSSS is located in the third and sixth OFDM symbols of one slot, and the other of the PSSS and the SSSS is located in the ninth and twelfth OFDM symbols of one slot;

one of the PSSS and the SSSS is located in the second and ninth OFDM symbols of one slot, and the other of the PSSS and the SSSS is located in the fifth and twelfth OFDM symbols of one slot;

one of the PSSS and the SSSS is located in the second and ninth OFDM symbols of one slot, and the other of the PSSS and the SSSS is located in the sixth and thirteenth OFDM symbols of one slot;

one of the PSSS and the SSSS is located in the third and tenth OFDM symbols of one slot, and the other of the PSSS and the SSSS is located in the sixth and thirteenth OFDM symbols of one slot; or, one of the PSSS and the SSSS is located in the fourth and eleventh OFDM symbols of one slot, and the other of the PSSS and the SSSS is located in the sixth and thirteenth OFDM symbols of one slot.

Further, when the subcarrier spacing is the fourth spacing, the preset rule is at least one of the following:

one of the PSSS and the SSSS is located in the third and fourth OFDM symbols of one slot, and the other of the PSSS and the SSSS is located in the eleventh and twelfth OFDM symbols of one slot;

one of the PSSS and the SSSS is located in the third and ninth OFDM symbols of one slot, and the other of the PSSS and the SSSS is located in the sixth and twelfth OFDM symbols of one slot;

one of the PSSS and the SSSS is located in the fourth and tenth OFDM symbols of one slot, and the other of the PSSS and the SSSS is located in the sixth and twelfth OFDM symbols of one slot; or, one of the PSSS and the SSSS is located in the third and tenth OFDM symbols of one slot, and the other of the PSSS and the SSSS is located in the fifth and twelfth OFDM symbols of one slot.

Further, when the PSSS employs an M-sequence, the M-sequence includes:

a sequence formed according to an equation: $d_{pass}(n)=1-2x(m)$;

where $d_{pass}(n)$ is the M-sequence; n is an index of the M-sequence, and $0 \leq n < 127$; m is an index of the sequence x, and $m=(n+XN_{ID}^{SL(2)}) \mod 127$, $N_{ID}^{SL(2)}$ is a group ID of a sidelink synchronization ID, X is a cyclic shift; and x(m) is obtained by using the equation $x(i+7)=(x(i+1)+x(i)) \mod 2$.

Optionally, when candidate time domain locations of at least two sidelink synchronization signal blocks are consecutive in time domain, and sidelink synchronization signal blocks have been transmitted or received on the candidate time domain locations of the at least two sidelink synchronization signal blocks, transmission directions of the sidelink synchronization signal blocks on the candidate time domain locations of the at least two sidelink synchronization signal blocks are the same.

Optionally, the sidelink synchronization signal block is transmitted or received within one time window.

Optionally, the sidelink synchronization signal block is transmitted or received within a preset time window.

It should be noted that, the terminal embodiment is a terminal corresponding to the foregoing synchronization signal transmission method applied to a terminal side, all implementations of the foregoing embodiments are applicable to the terminal embodiment, and a same technical effect can be achieved.

Figure 19:
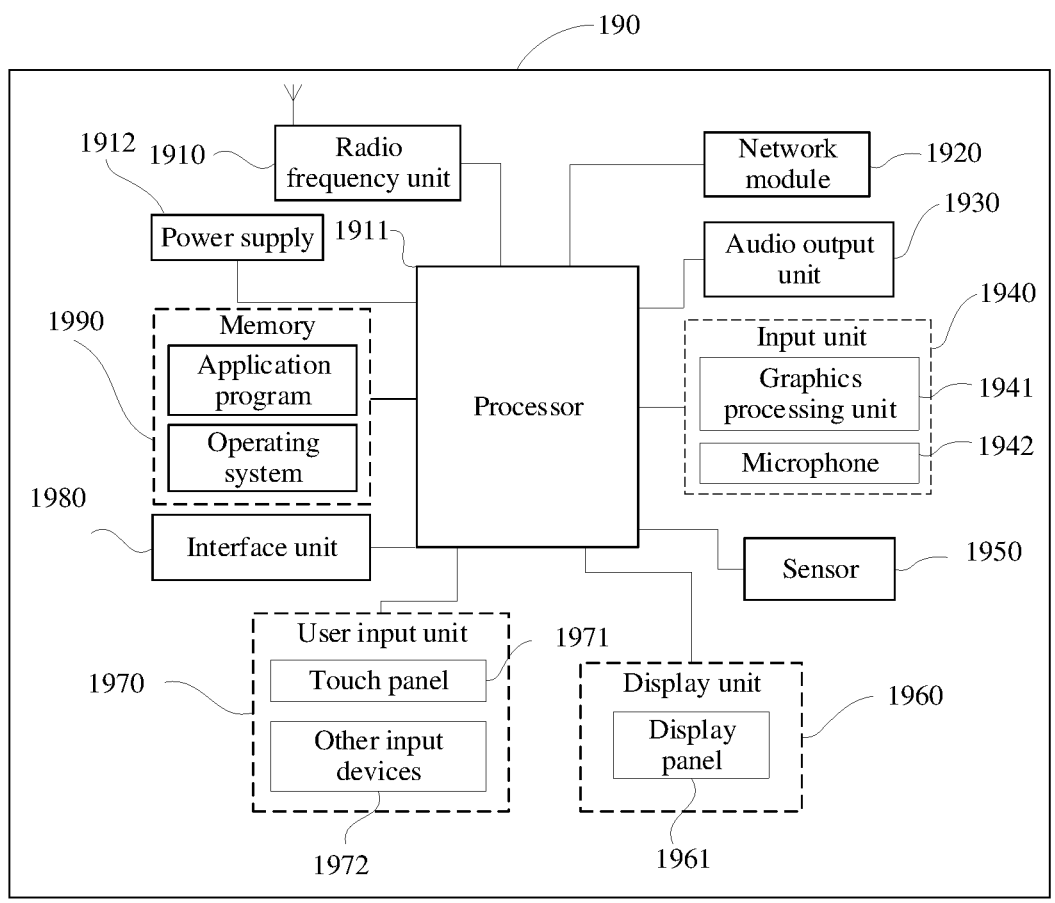
FIG. 19 is a structural block diagram of a terminal according to an embodiment of this disclosure.

FIG. 19 is a schematic diagram of a hardware structure of a terminal for implementing the embodiments of this disclosure.

The terminal 190 includes but is not limited to components such as a radio frequency unit 1910, a network module 1920, an audio output unit 1930, an input unit 1940, a sensor 1950, a display unit 1960, a user input unit 1970, an interface unit 1980, a memory 1990, a processor 1911, and a power supply 1912. A person skilled in the art may understand that the structure of the terminal shown in FIG. 19 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 1910 is configured to transmit or receive a sidelink synchronization signal block;

where the sidelink synchronization signal block includes: a primary sidelink synchronization signal PSSS and a secondary sidelink synchronization signal SSSS, the PSSS and the SSSS being distributed in orthogonal frequency division multiplexing OFDM symbols occupied by the sidelink synchronization signal block.

The terminal according to this embodiment of this disclosure can improve network communication process and ensure reliability of network communication by distributing a PSSS and an SSSS in OFDM symbols occupied by a sidelink synchronization signal block.

It should be understood that in this embodiment of this disclosure, the radio frequency unit 1910 may be configured to receive and send signals in an information reception or transmission or call process. Specifically, after receiving downlink data from the network device, the radio frequency unit 1910 sends the downlink data to the processor 1911 for processing, and in addition, sends uplink data to the network device. Generally, the radio frequency unit 1910 includes but is not limited to an antenna, at least one amplifier, a transceiver, a coupler, a low noise amplifier, a duplexer, and the like. In addition, the radio frequency unit 1910 may further communicate with a network and another device through a wireless communications system.

The terminal provides wireless broadband internet access for a user by using the network module 1920, for example, helps the user send and receive e-mails, browse web pages, and access streaming media.

The audio output unit 1930 may convert audio data received by the radio frequency unit 1910 or the network module 1920 or stored in the memory 1990 into an audio signal and output the audio signal as a sound. In addition, the audio output unit 1930 may further provide audio output (for example, a call signal reception tone or a message reception tone) that is related to a specific function performed by the terminal 190. The audio output unit 1930 includes a speaker, a buzzer, a telephone receiver, and the like.

The input unit 1940 is configured to receive an audio or video signal. The input unit 1940 may include a graphics processing unit (Graphics Processing Unit, GPU) 1941 and a microphone 1942, and the graphics processing unit 1941 processes image data of a still picture or a video obtained by an image capture apparatus (for example, a camera) in an image capture mode or a video capture mode. A processed image frame may be displayed on the display unit 1960. The image frame processed by the graphics processing unit 1941 may be stored in the memory 1990 (or another storage medium) or sent by the radio frequency unit 1910 or the network module 1920. The microphone 1942 can receive a sound and can process the sound into audio data. The processed audio data may be converted, in a telephone call mode, into a format that can be sent to a mobile communications network device through the radio frequency unit 1910, for outputting.

The terminal 190 further includes at least one sensor 1950, for example, an optical sensor, a motion sensor, and another sensor. Specifically, the optical sensor includes an ambient light sensor and a proximity sensor. The ambient light sensor may adjust brightness of a display panel 1961 based on intensity of ambient light. When the terminal 190 moves near an ear, the proximity sensor may disable the display panel 1961 and/or backlight. As a motion sensor, an accelerometer sensor may detect for a value of an acceleration in various directions (there are usually three axes), may detect for a value and a direction of gravity when the terminal is static, and may be configured to recognize a posture of the terminal (for example, landscape/portrait mode switching, a related game, or magnetometer posture calibration), provide a function related to vibration recognition (for example, a pedometer or a keystroke), or the like. The sensor 1950 may further include a fingerprint sensor, a pressure sensor, an iris sensor, a molecular sensor, a gyroscope, a barometer, a hygrometer, a thermometer, or an infrared sensor. Details are not described herein.

The display unit 1960 is configured to display information input by the user or information provided for the user. The display unit 1960 may include a display panel 1961, and the display panel 1961 may be configured in the form of a liquid crystal display (Liquid Crystal Display, LCD), an organic light-emitting diode (Organic Light-Emitting Diode, OLED), or the like.

The user input unit 1970 may be configured to receive input digit or character information, and generate a key signal input related to a user setting and function control of the terminal. Specifically, the user input unit 1970 includes a touch panel 1971 and other input devices 1972. The touch panel 1971, also referred to as a touchscreen, may capture a touch operation performed by a user on or near the touch panel (for example, an operation performed by the user on the touch panel 1971 or near the touch panel 1971 by using any appropriate object or accessory such as a finger or a stylus). The touch panel 1971 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 1911, and receives and executes a command sent by the processor 1911. In addition, the touch panel 1971 may be implemented in a plurality of forms, for example, as a resistive, capacitive, infrared, or surface acoustic wave touch panel. The user input unit 1970 may further include other input devices 1972 in addition to the touch panel 1971. Specifically, the other input devices 1972 may include but are not limited to a physical keyboard, a function key (such as a volume control key or a power on/off key), a trackball, a mouse, a joystick, and the like. Details are not described herein.

Further, the touch panel 1971 may cover the display panel 1961. When detecting a touch operation on or near the touch panel 1971, the touch panel 1971 transmits the touch operation to the processor 1911 to determine a type of a touch event. Then, the processor 1911 provides a corresponding visual output on the display panel 1961 based on the type of the touch event. In FIG. 19, the touch panel 1971 and the display panel 1961 serve as two independent components to implement input and output functions of the terminal. However, in some embodiments, the touch panel 1971 and the display panel 1961 may be integrated to implement the input and output functions of the terminal. This is not specifically limited herein.

The interface unit 1980 is an interface for connecting an external apparatus to the terminal 190. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 1980 may be configured to receive input (for example, data information and electric power) from the external apparatus, and transmit the received input to one or more elements in the terminal 190; or may be configured to transmit data between the terminal 190 and the external apparatus.

The memory 1990 may be configured to store a software program and various data. The memory 1990 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 1990 may include a high-speed random access memory, or may include a non-volatile memory, for example, at least one magnetic disk storage device, a flash memory device, or other volatile solid-state storage devices.

The processor 1911 is a control center of the terminal, connects various parts of the entire terminal by using various interfaces and lines, and executes various functions and data processing of the terminal by running or executing a software program and/or a module stored in the memory 1990 and invoking data stored in the memory 1990, so as to perform overall monitoring on the terminal. The processor 1911 may include one or more processing units. Optionally, the processor 1911 may integrate an application processor and a modem processor. The application processor mainly processes an operating system, a user interface, an application program, and the like. The modem processor mainly processes wireless communication. It may be understood that the modem processor may alternatively not be integrated into the processor 1911.

The terminal 190 may further include the power supply 1912 (for example, a battery) that supplies power to each component. Optionally, the power supply 1912 may be logically connected to the processor 1911 by using a power management system, so as to implement functions such as charging management, discharging management, and power consumption management by using the power management system.

In addition, the terminal 190 may include some functional modules that are not shown. Details are not described herein.

Optionally, an embodiment of this disclosure further provides a terminal, including a processor 1911, a memory 1990, and a computer program stored in the memory 1990 and capable of running on the processor 1911. When the computer program is executed by the processor 1911, the processes of the embodiments of the synchronization signal transmission method applied to the terminal side are implemented, and a same technical effect can be achieved. To avoid repetition, details are not described herein again.

An embodiment of this disclosure further provides a computer-readable storage medium, where the computer-readable storage medium stores a computer program. When the computer program is executed by a processor, the processes of the embodiments of the synchronization signal transmission method applied to the terminal side are implemented, and a same technical effect can be achieved. To avoid repetition, details are not described herein again. For example, the computer-readable storage medium is a read-only memory (Read-Only Memory, ROM), a random access memory (Random Access Memory, RAM), a magnetic disk, or an optical disk.

The network device according to the embodiments of this disclosure may be a base transceiver station (Base Transceiver Station, BTS) in a global system for mobile communications (Global System for Mobile Communications, GSM) or code division multiple access (Code Division Multiple Access, CDMA), or may be a NodeB (NodeB, NB) in wideband code division multiple access (Wideband Code Division Multiple Access, WCDMA), or may be an evolved NodeB (Evolved NodeB, eNB or eNodeB), a relay station, or an access point in LTE, or may be a base station in a future 8G network, or the like, which is not limited herein.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing descriptions are merely optional implementations of this disclosure. It should be noted that a person of ordinary skill in the art may make several improvements or polishing without departing from the principle of this disclosure and the improvements and polishing shall fall within the protection scope of the present disclosure.

What is claimed is:

1. A synchronization signal transmission method, applied to a terminal side, comprising:
   transmitting or receiving a sidelink synchronization signal block,
   wherein the sidelink synchronization signal block comprises: a primary sidelink synchronization signal PSSS and a secondary sidelink synchronization signal SSSS, the PSSS and the SSSS being distributed in orthogonal frequency division multiplexing OFDM symbols occupied by the sidelink synchronization signal block according to a preset rule, wherein the preset rule comprises at least one of the following:
   one of the PSSS and the SSSS is located in the third symbol of a sidelink synchronization signal block, and the other of the PSSS and the SSSS is located in the fifth symbol of the sidelink synchronization signal block;
   one of the PSSS and the SSSS is located in the second symbol of a sidelink synchronization signal block, and the other of the PSSS and the SSSS is located in the fifth symbol of the sidelink synchronization signal block;
   one of the PSSS and the SSSS is located in the second symbol of a sidelink synchronization signal block, and the other of the PSSS and the SSSS is located in the sixth symbol of the sidelink synchronization signal block;
   one of the PSSS and the SSSS is located in the third symbol of a sidelink synchronization signal block, and the other of the PSSS and the SSSS is located in the sixth symbol of the sidelink synchronization signal block; or,
   one of the PSSS and the SSSS is located in the fourth symbol of a sidelink synchronization signal block, and the other of the PSSS and the SSSS is located in the sixth symbol of the sidelink synchronization signal block;
   wherein when one slot comprises candidate time domain locations of at least two sidelink synchronization signal blocks, and the subcarrier spacing is a second spacing, and one slot comprises candidate time domain locations of two sidelink synchronization signal blocks, an OFDM symbol index corresponding to the first symbol of candidate time domain locations of each of the two sidelink synchronization signal blocks is x+14n or y+14n,
   wherein 0≤n<m; m is a maximum number of slots occupied by a sidelink synchronization signal block; and n=0 corresponds to the first OFDM symbol of the first slot comprising candidate time domain locations of a sidelink synchronization signal block, a value of x is set to 0, and a value of y is set to 6 or 7;
   wherein when one slot comprises candidate time domain locations of a sidelink synchronization signal block, the preset rule comprises at least one of the following:
   one of the PSSS and the SSSS is located in the third and fourth OFDM symbols of one slot, and the other of the PSSS and the SSSS is located in the eleventh and twelfth OFDM symbols of one slot;
   one of the PSSS and the SSSS is located in the second and third OFDM symbols of one slot, and the other of the PSSS and the SSSS is located in the twelfth and thirteenth OFDM symbols of one slot;
   one of the PSSS and the SSSS is located in the fifth and seventh OFDM symbols of one slot, and the other of the PSSS and the SSSS is located in the tenth and twelfth OFDM symbols of one slot;
   one of the PSSS and the SSSS is located in the third and sixth OFDM symbols of one slot, and the other of the PSSS and the SSSS is located in the ninth and twelfth OFDM symbols of one slot;
   one of the PSSS and the SSSS is located in the second and ninth OFDM symbols of one slot, and the other of the PSSS and the SSSS is located in the fifth and twelfth OFDM symbols of one slot;
one of the PSSS and the SSSS is located in the second and ninth OFDM symbols of one slot, and the other of the PSSS and the SSSS is located in the sixth and thirteenth OFDM symbols of one slot;
one of the PSSS and the SSSS is located in the third and tenth OFDM symbols of one slot, and the other of the PSSS and the SSSS is located in the sixth and thirteenth OFDM symbols of one slot;
one of the PSSS and the SSSS is located in the fourth and eleventh OFDM symbols of one slot, and the other of the PSSS and the SSSS is located in the sixth and thirteenth OFDM symbols of one slot;
one of the PSSS and the SSSS is located in the third and ninth OFDM symbols of one slot, and the other of the PSSS and the SSSS is located in the sixth and twelfth OFDM symbols of one slot;
one of the PSSS and the SSSS is located in the fourth and tenth OFDM symbols of one slot, and the other of the PSSS and the SSSS is located in the sixth and twelfth OFDM symbols of one slot; or,
one of the PSSS and the SSSS is located in the third and tenth OFDM symbols of one slot, and the other of the PSSS and the SSSS is located in the fifth and twelfth OFDM symbols of one slot.

2. The synchronization signal transmission method according to claim 1, wherein when one slot comprises candidate time domain locations of two sidelink synchronization signal blocks, an OFDM symbol index corresponding to the first symbol of candidate time domain locations of each of the two sidelink synchronization signal blocks is 14n or 7+14n,
wherein $0 \leq n < m$; m is a maximum number of slots occupied by sidelink synchronization signal block; and n=0 corresponds to the first OFDM symbol of the first slot comprising candidate time domain locations of a sidelink synchronization signal block.

3. The synchronization signal transmission method according to claim 1, wherein when the number of OFDM symbols occupied by a sidelink synchronization signal block is greater than or equal to 5, the preset rule is:
one of the PSSS and the SSSS is located in the second symbol of a sidelink synchronization signal block, and the other of the PSSS and the SSSS is located in the fifth symbol of the sidelink synchronization signal block.

4. The synchronization signal transmission method according to claim 1, wherein when the number of OFDM symbols occupied by a sidelink synchronization signal block is greater than or equal to 6, the preset rule is at least one of the following:
one of the PSSS and the SSSS is located in the second symbol of a sidelink synchronization signal block, and the other of the PSSS and the SSSS is located in the sixth symbol of the sidelink synchronization signal block;
one of the PSSS and the SSSS is located in the third symbol of a sidelink synchronization signal block, and the other of the PSSS and the SSSS is located in the sixth symbol of the sidelink synchronization signal block; or,
one of the PSSS and the SSSS is located in the fourth symbol of a sidelink synchronization signal block, and the other of the PSSS and the SSSS is located in the sixth symbol of the sidelink synchronization signal block.

5. The synchronization signal transmission method according to claim 1, wherein when the subcarrier spacing is a first spacing, and one slot comprises candidate time domain locations of two sidelink synchronization signal blocks, an OFDM symbol index corresponding to the first symbol of candidate time domain locations of each of the two sidelink synchronization signal blocks is 14n or 7+14n,
wherein $0 \leq n < m$; m is a maximum number of slots occupied by sidelink synchronization signal block; and n=0 corresponds to the first OFDM symbol of the first slot comprising candidate time domain locations of a sidelink synchronization signal block.

6. The synchronization signal transmission method according to claim 1, wherein when the subcarrier spacing is a first spacing, and a number of OFDM symbols occupied by a sidelink synchronization signal block is greater than or equal to 5, the preset rule is:
one of the PSSS and the SSSS is located in the second symbol of a sidelink synchronization signal block, and the other of the PSSS and the SSSS is located in the fifth symbol of the sidelink synchronization signal block.

7. The synchronization signal transmission method according to claim 1, wherein when the subcarrier spacing is a first spacing, and a number of OFDM symbols occupied by a sidelink synchronization signal block is greater than or equal to 6, the preset rule is at least one of the following:
one of the PSSS and the SSSS is located in the second symbol of a sidelink synchronization signal block, and the other of the PSSS and the SSSS is located in the sixth symbol of the sidelink synchronization signal block;
one of the PSSS and the SSSS is located in the third symbol of a sidelink synchronization signal block, and the other of the PSSS and the SSSS is located in the sixth symbol of the sidelink synchronization signal block; or,
one of the PSSS and the SSSS is located in the fourth symbol of a sidelink synchronization signal block, and the other of the PSSS and the SSSS is located in the sixth symbol of the sidelink synchronization signal block.

8. The synchronization signal transmission method according to claim 1, wherein when the subcarrier spacing is a second spacing, and a number of OFDM symbols occupied by a sidelink synchronization signal block is greater than or equal to 6, the preset rule is at least one of the following:
one of the PSSS and the SSSS is located in the third symbol of a sidelink synchronization signal block, and the other of the PSSS and the SSSS is located in the sixth symbol of the sidelink synchronization signal block; or,
one of the PSSS and the SSSS is located in the fourth symbol of a sidelink synchronization signal block, and the other of the PSSS and the SSSS is located in the sixth symbol of the sidelink synchronization signal block.

9. The synchronization signal transmission method according to claim 1, wherein when the subcarrier spacing is 120 kHz, and a number of OFDM symbols occupied by a sidelink synchronization signal block is greater than or equal to 5, the preset rule comprises:
one of the PSSS and the SSSS is located in the third symbol of a sidelink synchronization signal block, and the other of the PSSS and the SSSS is located in the fifth symbol of the sidelink synchronization signal block.

10. The synchronization signal transmission method according to claim 1, when the preset rule is: one of the PSSS and the SSSS is located in the third and fourth OFDM symbols of one slot, and the other of the PSSS and the SSSS is located in the eleventh and twelfth OFDM symbols of one slot; or when one of the PSSS and the SSSS is located in the second and third OFDM symbols of one slot, and the other of the PSSS and the SSSS is located in the twelfth and thirteenth OFDM symbols of one slot, the sixth and ninth OFDM symbols of one slot is used for transmitting or receiving a demodulation reference signal.

11. The synchronization signal transmission method according to claim 1, wherein when at least two candidate time domain locations of sidelink synchronization signal blocks are consecutive in time domain, and sidelink synchronization signal blocks have been transmitted or received on at least the candidate time domain locations of the sidelink synchronization signal blocks, transmission directions of the sidelink synchronization signal blocks on the candidate time domain locations of the at least two sidelink synchronization signal blocks are the same.

12. The synchronization signal transmission method according to claim 1, wherein when the subcarrier spacing is a third spacing, the preset rule is at least one of the following:

one of the PSSS and the SSSS is located in the third and sixth OFDM symbols of one slot, and the other of the PSSS and the SSSS is located in the ninth and twelfth OFDM symbols of one slot;

one of the PSSS and the SSSS is located in the second and ninth OFDM symbols of one slot, and the other of the PSSS and the SSSS is located in the fifth and twelfth OFDM symbols of one slot;

one of the PSSS and the SSSS is located in the second and ninth OFDM symbols of one slot, and the other of the PSSS and the SSSS is located in the sixth and thirteenth OFDM symbols of one slot;

one of the PSSS and the SSSS is located in the third and tenth OFDM symbols of one slot, and the other of the PSSS and the SSSS is located in the sixth and thirteenth OFDM symbols of one slot; or, one of the PSSS and the SSSS is located in the fourth and eleventh OFDM symbols of one slot, and the other of the PSSS and the SSSS is located in the sixth and thirteenth OFDM symbols of one slot.

13. The synchronization signal transmission method according to claim 1, wherein when the subcarrier spacing is a fourth spacing, the preset rule is at least one of the following:

one of the PSSS and the SSSS is located in the third and fourth OFDM symbols of one slot, and the other of the PSSS and the SSSS is located in the eleventh and twelfth OFDM symbols of one slot;

one of the PSSS and the SSSS is located in the third and ninth OFDM symbols of one slot, and the other of the PSSS and the SSSS is located in the sixth and twelfth OFDM symbols of one slot;

one of the PSSS and the SSSS is located in the fourth and tenth OFDM symbols of one slot, and the other of the PSSS and the SSSS is located in the sixth and twelfth OFDM symbols of one slot; or, one of the PSSS and the SSSS is located in the third and tenth OFDM symbols of one slot, and the other of the PSSS and the SSSS is located in the fifth and twelfth OFDM symbols of one slot.

14. A terminal, comprising a memory, a processor, and a program stored in the memory and capable of running on the processor, wherein when the program is executed by the processor, steps of a synchronization signal transmission method are implemented, wherein the synchronization signal transmission method comprises:

transmitting or receiving a sidelink synchronization signal block, wherein the sidelink synchronization signal block comprises: a primary sidelink synchronization signal PSSS and a secondary sidelink synchronization signal SSSS, the PSSS and the SSSS being distributed in orthogonal frequency division multiplexing OFDM symbols occupied by the sidelink synchronization signal block according to a preset rule, wherein the preset rule comprises at least one of the following:

one of the PSSS and the SSSS is located in the third symbol of a sidelink synchronization signal block, and the other of the PSSS and the SSSS is located in the fifth symbol of the sidelink synchronization signal block;

one of the PSSS and the SSSS is located in the second symbol of a sidelink synchronization signal block, and the other of the PSSS and the SSSS is located in the fifth symbol of the sidelink synchronization signal block;

one of the PSSS and the SSSS is located in the second symbol of a sidelink synchronization signal block, and the other of the PSSS and the SSSS is located in the sixth symbol of the sidelink synchronization signal block;

one of the PSSS and the SSSS is located in the third symbol of a sidelink synchronization signal block, and the other of the PSSS and the SSSS is located in the sixth symbol of the sidelink synchronization signal block; or, one of the PSSS and the SSSS is located in the fourth symbol of a sidelink synchronization signal block, and the other of the PSSS and the SSSS is located in the sixth symbol of the sidelink synchronization signal block;

wherein when one slot comprises candidate time domain locations of at least two sidelink synchronization signal blocks, and the subcarrier spacing is a second spacing, and one slot comprises candidate time domain locations of two sidelink synchronization signal blocks, an OFDM symbol index corresponding to the first symbol of candidate time domain locations of each of the two sidelink synchronization signal blocks is x+14n or y+14n, wherein $0 \leq n < m$; m is a maximum number of slots occupied by a sidelink synchronization signal block; and n=0 corresponds to the first OFDM symbol of the first slot comprising candidate time domain locations of a sidelink synchronization signal block, a value of x is set to 0, and a value of y is set to 6 or 7;

wherein when one slot comprises candidate time domain locations of a sidelink synchronization signal block, the preset rule comprises at least one of the following:

one of the PSSS and the SSSS is located in the third and fourth OFDM symbols of one slot, and the other of the PSSS and the SSSS is located in the eleventh and twelfth OFDM symbols of one slot;

one of the PSSS and the SSSS is located in the second and third OFDM symbols of one slot, and the other of the PSSS and the SSSS is located in the twelfth and thirteenth OFDM symbols of one slot;

one of the PSSS and the SSSS is located in the fifth and seventh OFDM symbols of one slot, and the other of the PSSS and the SSSS is located in the tenth and twelfth OFDM symbols of one slot;

one of the PSSS and the SSSS is located in the third and sixth OFDM symbols of one slot, and the other of the PSSS and the SSSS is located in the ninth and twelfth OFDM symbols of one slot;

one of the PSSS and the SSSS is located in the second and ninth OFDM symbols of one slot, and the other of the PSSS and the SSSS is located in the fifth and twelfth OFDM symbols of one slot;

one of the PSSS and the SSSS is located in the second and ninth OFDM symbols of one slot, and the other of the PSSS and the SSSS is located in the sixth and thirteenth OFDM symbols of one slot;

one of the PSSS and the SSSS is located in the third and tenth OFDM symbols of one slot, and the other of the PSSS and the SSSS is located in the sixth and thirteenth OFDM symbols of one slot;

one of the PSSS and the SSSS is located in the fourth and eleventh OFDM symbols of one slot, and the other of the PSSS and the SSSS is located in the sixth and thirteenth OFDM symbols of one slot;

one of the PSSS and the SSSS is located in the third and ninth OFDM symbols of one slot, and the other of the PSSS and the SSSS is located in the sixth and twelfth OFDM symbols of one slot;

one of the PSSS and the SSSS is located in the fourth and tenth OFDM symbols of one slot, and the other of the PSSS and the SSSS is located in the sixth and twelfth OFDM symbols of one slot; or, one of the PSSS and the SSSS is located in the third and tenth OFDM symbols of one slot, and the other of the PSSS and the SSSS is located in the fifth and twelfth OFDM symbols of one slot.

15. A non-transitory computer-readable storage medium, wherein the non-transitory computer-readable storage medium stores a program, and when the program is executed by a processor, steps of a synchronization signal transmission method are implemented, wherein the synchronization signal transmission method comprises:

transmitting or receiving a sidelink synchronization signal block, wherein the sidelink synchronization signal block comprises: a primary sidelink synchronization signal PSSS and a secondary sidelink synchronization signal SSSS, the PSSS and the SSSS being distributed in orthogonal frequency division multiplexing OFDM symbols occupied by the sidelink synchronization signal block according to a preset rule, wherein the preset rule comprises at least one of the following:

one of the PSSS and the SSSS is located in the third symbol of a sidelink synchronization signal block, and the other of the PSSS and the SSSS is located in the fifth symbol of the sidelink synchronization signal block;

one of the PSSS and the SSSS is located in the second symbol of a sidelink synchronization signal block, and the other of the PSSS and the SSSS is located in the fifth symbol of the sidelink synchronization signal block;

one of the PSSS and the SSSS is located in the second symbol of a sidelink synchronization signal block, and the other of the PSSS and the SSSS is located in the sixth symbol of the sidelink synchronization signal block;

one of the PSSS and the SSSS is located in the third symbol of a sidelink synchronization signal block, and the other of the PSSS and the SSSS is located in the sixth symbol of the sidelink synchronization signal block; or, one of the PSSS and the SSSS is located in the fourth symbol of a sidelink synchronization signal block, and the other of the PSSS and the SSSS is located in the sixth symbol of the sidelink synchronization signal block;

wherein when one slot comprises candidate time domain locations of at least two sidelink synchronization signal blocks, and the subcarrier spacing is a second spacing, and one slot comprises candidate time domain locations of two sidelink synchronization signal blocks, an OFDM symbol index corresponding to the first symbol of candidate time domain locations of each of the two sidelink synchronization signal blocks is x+14n or y+14n, wherein 0≤n<m; m is a maximum number of slots occupied by a sidelink synchronization signal block; and n=0 corresponds to the first OFDM symbol of the first slot comprising candidate time domain locations of a sidelink synchronization signal block, a value of x is set to 0, and a value of y is set to 6 or 7;

wherein when one slot comprises candidate time domain locations of a sidelink synchronization signal block, the preset rule comprises at least one of the following:

one of the PSSS and the SSSS is located in the third and fourth OFDM symbols of one slot, and the other of the PSSS and the SSSS is located in the eleventh and twelfth OFDM symbols of one slot;

one of the PSSS and the SSSS is located in the second and third OFDM symbols of one slot, and the other of the PSSS and the SSSS is located in the twelfth and thirteenth OFDM symbols of one slot;

one of the PSSS and the SSSS is located in the fifth and seventh OFDM symbols of one slot, and the other of the PSSS and the SSSS is located in the tenth and twelfth OFDM symbols of one slot;

one of the PSSS and the SSSS is located in the third and sixth OFDM symbols of one slot, and the other of the PSSS and the SSSS is located in the ninth and twelfth OFDM symbols of one slot;

one of the PSSS and the SSSS is located in the second and ninth OFDM symbols of one slot, and the other of the PSSS and the SSSS is located in the fifth and twelfth OFDM symbols of one slot;

one of the PSSS and the SSSS is located in the second and ninth OFDM symbols of one slot, and the other of the PSSS and the SSSS is located in the sixth and thirteenth OFDM symbols of one slot;

one of the PSSS and the SSSS is located in the third and tenth OFDM symbols of one slot, and the other of the PSSS and the SSSS is located in the sixth and thirteenth OFDM symbols of one slot;

one of the PSSS and the SSSS is located in the fourth and eleventh OFDM symbols of one slot, and the other of the PSSS and the SSSS is located in the sixth and thirteenth OFDM symbols of one slot;

one of the PSSS and the SSSS is located in the third and ninth OFDM symbols of one slot, and the other of the PSSS and the SSSS is located in the sixth and twelfth OFDM symbols of one slot;

one of the PSSS and the SSSS is located in the fourth and tenth OFDM symbols of one slot, and the other of the PSSS and the SSSS is located in the sixth and twelfth OFDM symbols of one slot; or, one of the PSSS and the SSSS is located in the third and tenth OFDM symbols of one slot, and the other of the PSSS and the SSSS is located in the fifth and twelfth OFDM symbols of one slot.

16. The terminal according to claim 15, wherein when one slot comprises candidate time domain locations of two sidelink synchronization signal blocks, an OFDM symbol index corresponding to the first symbol of candidate time domain locations of each of the two sidelink synchronization signal blocks is 14n or 7+14n, wherein $0 \leq n < m$; m is a maximum number of slots occupied by sidelink synchronization signal block; and n=0 corresponds to the first OFDM symbol of the first slot comprising candidate time domain locations of a sidelink synchronization signal block.

* * * * *